United States Patent
Yoon

(10) Patent No.: US 9,236,003 B2
(45) Date of Patent: Jan. 12, 2016

(54) DISPLAY APPARATUS, USER TERMINAL APPARATUS, EXTERNAL APPARATUS, DISPLAY METHOD, DATA RECEIVING METHOD AND DATA TRANSMITTING METHOD

(71) Applicant: SAMSUNG ELECTRONICS CO., LTD., Suwon-si (KR)

(72) Inventor: Tae-min Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/046,379

(22) Filed: Oct. 4, 2013

(65) Prior Publication Data

US 2014/0098076 A1    Apr. 10, 2014

(30) Foreign Application Priority Data

Oct. 4, 2012    (KR) .......................... 10-2012-0110330

(51) Int. Cl.
*G09G 3/20*    (2006.01)
*H04N 21/4722*    (2011.01)
*H04N 21/41*    (2011.01)

(52) U.S. Cl.
CPC .............. *G09G 3/20* (2013.01); *H04N 21/4126* (2013.01); *H04N 21/4722* (2013.01)

(58) Field of Classification Search
CPC ................ G09G 5/006; G09G 3/3406; G09G 2320/0646
USPC ................................... 345/204, 156, 3.4, 699
See application file for complete search history.

(56) References Cited

U.S. PATENT DOCUMENTS

| | | | |
|---|---|---|---|
| 2001/0016060 A1* | 8/2001 | Ahn .............................. | 382/141 |
| 2002/0168069 A1* | 11/2002 | Tehranchi et al. ............ | 380/235 |
| 2004/0041913 A1* | 3/2004 | Takasumi et al. ........... | 348/207.2 |
| 2005/0047736 A1* | 3/2005 | Veligdan et al. .............. | 385/120 |
| 2012/0198572 A1 | 8/2012 | Beals et al. | |
| 2012/0218470 A1 | 8/2012 | Schaefer | |
| 2012/0281235 A1* | 11/2012 | Murata et al. ................. | 356/479 |
| 2012/0314090 A1* | 12/2012 | Jallow et al. ................ | 348/207.1 |
| 2013/0076866 A1* | 3/2013 | Drinkard et al. ................ | 348/47 |

(Continued)

FOREIGN PATENT DOCUMENTS

WO    2012/120524 A2    9/2012

OTHER PUBLICATIONS

Communication, dated for Nov. 13, 2013, issued by the European Patent Office in counterpart European Application No. 13186245.0.

(Continued)

*Primary Examiner* — Ricardo L Osorio
(74) *Attorney, Agent, or Firm* — Sughrue Mion, PLLC

(57) ABSTRACT

A user terminal apparatus is disclosed. A user terminal apparatus according to various exemplary embodiments includes a communication unit which communicates with an external apparatus, an image sensor unit which photographs an image being displayed on the display apparatus at a photographing speed above a frame rate of the display apparatus, and a control unit which controls to identify pattern information based on a placement of a pattern frame included in the image photographed by the image sensor unit, and to receive data related to the display apparatus from the external apparatus based on the identified pattern information.

20 Claims, 18 Drawing Sheets

(56) References Cited

U.S. PATENT DOCUMENTS

| | | | |
|---|---|---|---|
| 2013/0082981 A1* | 4/2013 | Chien et al. | 345/175 |
| 2013/0094705 A1* | 4/2013 | Tyagi et al. | 382/103 |
| 2014/0092150 A1* | 4/2014 | Slavenburg et al. | 345/698 |

OTHER PUBLICATIONS

Communication from the European Patent Office issued Nov. 18, 2015 in a counterpart European Application No. 13186245.0.

* cited by examiner

DISPLAY APPARATUS, USER TERMINAL APPARATUS, EXTERNAL APPARATUS, DISPLAY METHOD, DATA RECEIVING METHOD AND DATA TRANSMITTING METHOD

CROSS-REFERENCE TO RELATED APPLICATION

This application claims priority from Korean Patent Application No. 2012-0110330, filed in the Korean Intellectual Property Office on Oct. 4, 2012, the disclosure of which is incorporated herein by reference in its entirety.

BACKGROUND

1. Field

Methods and apparatuses consistent with the exemplary embodiments relate to a method for receiving data, and more particularly to a display apparatus for photographing a screen being displayed and receiving data related to the display apparatus, a user terminal apparatus, external apparatus, display method, and data transmitting method thereof.

2. Description of the Related Art

As informatization is accelerating, various technologies for providing large amounts of information quickly and easily are being developed. These technologies mostly relate to data transceiving among electronic devices. However, since there are various types of information and humans' cognitive ability is limited, it is important to come up with a method for efficiently obtaining information that one needs. That is, to a user, rather than how much information is provided, in what method and what kind of information is provided may be more important.

In related art, methods for providing information through words and texts mostly developed by methods for providing images. For example, such methods include outdoor billboards or window systems providing interfaces through icons.

A more developed type of method is a method of incorporating compressed information, for example, the QR Response developed by Denso Wave in Japan in 1994. According to this method, a user may photograph QR codes included in images and transmit the photographed information to a server, and information related to the QR codes may be received from the server. A QR code has a 2 dimensional configuration where up to 7,089 numbers, 4,296 letters, and 1,817 Chinese characters can be recorded utilizing length and width. QR codes have been widely used as important PR/marketing means of companies. As such, QR codes can be used as an efficient method for transmitting large amounts of information to proactive users who want to obtain 2 dimensional information related to images.

Recently, methods for transmitting information through multimedia contents are in the limelight. Multimedia contents are transmitted in formats where users can sense contents through their five senses, enabling efficient information transmission. Today's display apparatuses may transmit various information in almost all areas in video contents formats.

For example, billboards which used to be put up at outdoor walls or rooftops of buildings are, in part, are being replaced by digital signage equipped with electronic display means. Furthermore, video notice signs which use flat display technologies to provide public transportation information such as subways or buses are being provided.

However, such video information provision methods by way of display apparatuses lack advantages of QR codes. That is, they cannot provide means where compressed information is included in videos so that users can obtain 2 dimensional information using such information.

It is possible to interleave QR codes into videos, but the problem is that since images change in such videos, it is difficult for users to capture the QR codes, and further, when QR codes are interleaved, they cover parts of the videos. Therefore, there is need for a technology which enables easily obtaining 2 dimensional information from video information without interrupting viewing the videos.

SUMMARY

An aspect of the exemplary embodiments relates to a display apparatus, user terminal apparatus, external apparatus, display method, data transmitting method and data transmitting method which may obtain information related to the display apparatus easily and conveniently from image information which is displayed by the display apparatus using a user terminal apparatus.

According to an exemplary embodiment of the present disclosure, a display apparatus may comprise a signal processor which configures a plurality of image frames; a display unit which displays the plurality of image frames configured by the signal processor; and a controller configured to control to interleave a pattern frame between the plurality of image frames and to reconfigure and display the plurality of images frames according to pattern information, and the pattern information may be information used by an external apparatus to identify the display apparatus. The pattern frame may be a frame which represents a pattern through placement of one or more frames. And the pattern information may be predetermined.

In addition, the display apparatus may further comprise a backlight unit which provides light to the display unit, and the pattern frame may be one from among a black frame and a white frame, and the controller may control the backlight unit to supply light having a lowest brightness in a section where the black frame is interleaved, and to supply light having a highest brightness in a section where the white frame is interleaved.

According to an exemplary embodiment of the present disclosure, a terminal may comprise a communicator configured to communicate with an external apparatus; an image sensor which photographs an image to be displayed on a display apparatus at a photographing speed above a frame rate of the display apparatus; and a controller configured to control to identify pattern information based on a placement situation of a pattern frame included in the image photographed by the image sensor, and to receive data related to the display apparatus from the external apparatus based on the identified pattern information.

In addition, the identified pattern information may be transmitted to the external apparatus, and data related to the display apparatus may be received from the external apparatus.

In addition, the terminal apparatus may further include a storage which maps predetermined pattern information with equipment identification information and stores a result of the mapping, and the controller may be configured to control to read the equipment identification information mapped to the identified pattern information from the storage, to transmit the read equipment identification information to the external apparatus, and to receive data related to the display apparatus from the external apparatus.

Furthermore, the data related to the display apparatus in the aforementioned exemplary embodiment may be at least one from among audio data corresponding to the image that the display apparatus outputs and other contents corresponding to the image displayed by the display apparatus.

In addition, the data related to the display apparatus may be information for obtaining a control authority related to the display apparatus.

According to an exemplary embodiment of the present disclosure, an apparatus may comprise a storage which stores equipment identification information corresponding to a plurality of display apparatuses; a communicator configured to receive equipment identification information being mapped to identified pattern information from a terminal apparatus, when the pattern information is identified based on a placement of a pattern frame included in a photographed image; and a controller configured to control to transmit data related to a display apparatus corresponding to equipment identification information, when there exists equipment identification information identical to the equipment identification information stored in the storage.

According to an exemplary embodiment of the present disclosure, a display method may include configuring a plurality of image frames; interleaving a pattern frame between a plurality of image frames according to pattern information and reconfiguring the plurality of image frames, and displaying the reconfigured plurality of image frames; and the pattern information may be used by an external apparatus to identify a display apparatus.

Herein, the pattern frame may include one from among a black frame and a white frame, and may further include controlling the backlight unit to supply light having a lowest brightness in a section where the black frame is interleaved, and to supply light having a highest brightness in a section where the white frame is interleaved.

According to an exemplary embodiment of the present disclosure, a data receiving method may include photographing an image being displayed on a display apparatus at a photographing speed above a frame rate of the display apparatus; identifying pattern information based on a placement of a pattern frame included in the photographed image; and receiving data related to the display apparatus from an external apparatus based on the identified pattern information.

The receiving the data may comprise transmitting the identified pattern information to the external apparatus, and receiving data related to the display apparatus from the external apparatus.

In addition, the data receiving method may further include mapping predetermined pattern information with equipment identification information and storing a result of the mapping, and the receiving the data may comprise reading the equipment identification information mapped to the identified pattern information from the storage, transmitting the read equipment identification information to the external apparatus, and receiving the information related to the display apparatus from the external apparatus.

Herein, the data related to the display apparatus may be at least one from among audio data corresponding to the image that the display apparatus outputs and second contents.

In addition, the data related to the display apparatus may be information for obtaining a control authority related to the display apparatus.

According to an exemplary embodiment of the present disclosure, a data transmitting method may include storing equipment identification information corresponding to a plurality of display apparatuses; receiving equipment identification information being mapped to identified pattern information from the user terminal apparatus, when pattern information is identified based on a placement of a pattern frame included in a photographed image; and transmitting data related to a display apparatus corresponding to equipment identification information, when there exists equipment identification information identical to the equipment identification information stored in the storage.

According to an exemplary embodiment of the present disclosure, a recording medium may be a non-transitory recording medium where a program for performing any one of the aforementioned display method, data receiving method and data transmitting method is recorded.

According to various exemplary embodiments of the present disclosure, it becomes possible to obtain information related to the display apparatus easily and conveniently from the image information displayed on the display apparatus using the user terminal apparatus.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
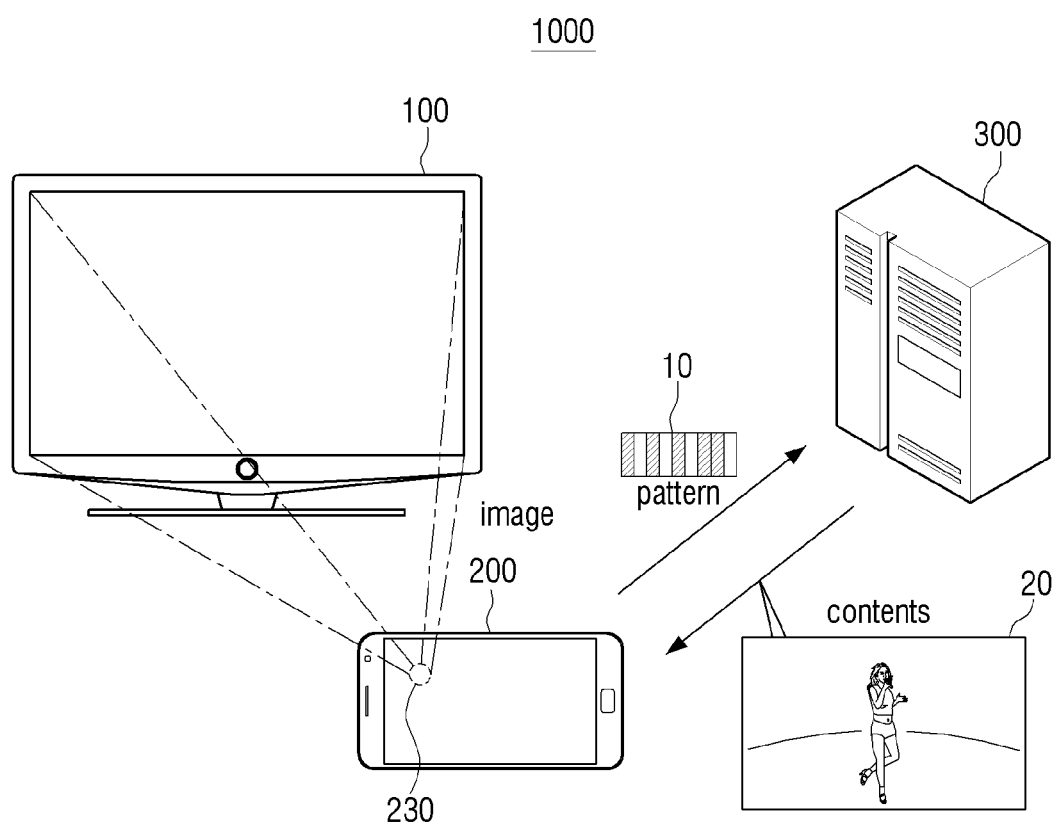
FIG. 1 is a conceptual diagram illustrating a data transceiving system according to an exemplary embodiment of the present disclosure.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Data Transceiving System

FIG. 1 is a conceptual diagram illustrating a data transceiving system 1000 according to an exemplary embodiment of the present disclosure.

With reference to FIG. 1, a data transceiving system 1000 according to an exemplary embodiment of the present disclosure includes a display apparatus 100, user terminal apparatus 200, and external apparatus 300.

As illustrated in FIG. 1, the display apparatus 100 displays an image. The display apparatus 100 interleaves a pattern frame among a plurality of image frames to reconfigure the plurality of image frames according to predetermined pattern information, and displays the reconfigured plurality of image frames.

The user terminal apparatus 200 may photograph the images that the display apparatus 100 displays. More particularly, the user terminal apparatus 200 photographs the plurality of images frames and the plurality of pattern frames interleaved therebetween displayed by the display apparatus 100. In addition, the user terminal apparatus 200 identifies pattern information 10 based on a placement situation of pattern frames included in the photographed images, and transmits the identified pattern information 10 to the external apparatus 300.

The external apparatus 100 transmits contents related to the display apparatus 100 to the user terminal apparatus 200 based on the pattern information 10.

As such, a user of the user terminal apparatus 200 may photograph patterns of the display apparatus 100 using his/her user terminal apparatus 200, and transmit the photographed pattern information 10 to the external apparatus, and receive data related to the display apparatus that he/she wants. The user terminal apparatus 200 displays the received contents 20 through a display screen or outputs sound of the received contents 20 through a speaker (not illustrated).

Detailed explanation on configurations and operations of each apparatus of the aforementioned data transceiving system 1000 is provided hereinbelow.

Configuration and Operations of the Display Apparatus

Figure 2:
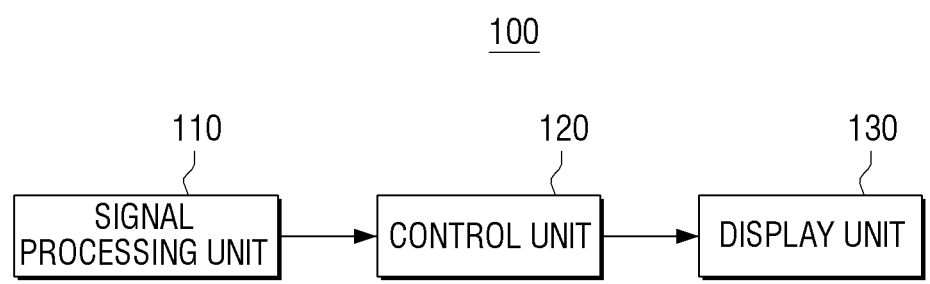
FIG. 2 is a block diagram illustrating a configuration of a display apparatus according to an exemplary embodiment of the present disclosure.

FIG. 2 is a block diagram illustrating a configuration of a display apparatus 100 according to an exemplary embodiment of the present disclosure.

In the present specification, the display apparatus 100 may be embodied as an apparatus which has one or more displays, and which is configured to execute applications or display contents, for example, as one of a digital television, tablet personal computer (PC), portable multimedia player (PMP), personal digital assistant (PDA), smart phone, mobile phone, digital photo frame, digital signage, and kiosk. By way of example, a digital television is explained hereinbelow.

With reference to FIG. 2, a display apparatus 100 according to an exemplary embodiment of the present disclosure includes a signal processing unit 110, control unit 120, and a display unit 130.

The signal processing unit 110 forms a plurality of image frames. More specifically, the signal processing unit 110 extracts audio data and video data from image contents, processes signals regarding the audio data and video data, and configures image frames and corresponding audio signals.

The signal processing unit 110 includes at least one of an A/V decoder (not illustrated), scaler (not illustrated), frame rate converter (not illustrated), and video enhancer (not illustrated).

The A/V decoder (not illustrated) extracts audio data and video data from image contents signals, and performs decoding on each audio data and video data.

The scaler (not illustrated) is a configuration for scaling image data to a display screen size. Scaling means multiplying an integer to a distribution range so that a distribution range of a pixel value is within a predetermined range. Up-scaling refers to a case where the predetermined range is greater than the distribution range of an initial image data, and after an up-scaling, a screen of the image data is enlarged to the predetermined ratio. On the other hand, down-scaling refers to a case where the predetermined range is smaller than the distribution range of a pixel value of the input image data, and after a down-scaling, a screen of the image data is reduced to the predetermined ratio. In the case of up-scaling, a pixel value on the input image data may match a plurality of pixel values of the image data screen as a result of the scaling, and thus resolution may decrease.

The frame rate converter (not illustrated) is a configuration of converting a frame rate of image data. Frame rate refers to a number of image frames output per second. The frame rate converter converts a frame rate of image contents to fit the output rate of the display apparatus 100. For example, in a case where the display apparatus 100 operates in 60 Hz, the frame rate converter may set the frame rate of the image contents as 60 Hz. When there is a small number of image frames, the frame rate converter uses subsequent image frames to create new image frames which are placed therebetween, whereas in a case where there is a large number of image frames, the frame rate converter deletes some of the image frames to match the frame rate.

In a case where the display apparatus 100 provides multi-views or 3D images, the frame rate converter needs a multiple of frame rate of single image data. For example, in a case of alternately outputting a left eye image frame and right eye image frame of 3D contents, the image frame rate of the 3D contents may be set as 60 Hz*2=120 Hz. Thus, it is possible to output image frames 120 times a second, and output each of the left eye image frame and right eye image frame 60 times per second alternately.

The video enhancer (not illustrated) is a configuration for removing deterioration or noise of an image. For example, the video enhancer gives the outlines definition by compensation for the deteriorated portion or removes noise.

The control unit 120 controls overall operations of the display apparatus 100. The control unit 120 includes a CPU which provides a clock to the hardware and transmits control signals, a memory for temporarily or semi-permanently storing processes, a GPU for processing graphics, and a system BUS for transmitting data among the memory, CPU and GPU. In addition, the control unit 120 includes an operating system (OS) for driving the hardware configuration, and an application which provides a user interface on the operating system and transmits it to the framework.

In particular, the control unit 120 controls the signal processing unit 110 to interleave frame patterns among the plurality of image frames and reconfigure the plurality image frames according to the predetermined pattern information.

A pattern frame refers to a frame which may represent a pattern through placement of one or more frames. For example, a pattern frame may be a black frame or white frame. The black frame refers to a frame where the pixel values of all pixels forming a frame correspond to black color or to a frame of a similar case. On the other hand, the white frame refers to where the pixel values of all pixels forming a frame correspond to white color or to a frame of a similar case.

A pattern may be displayed through placement of the black frame and white frame. Representing black frame as B, and white frame as W, it is possible to express various patterns through a pattern frame of a predetermined number. For example, BWBWBWBW may be defined as one pattern. Furthermore, BBBWWWBBWWBW may be defined as another pattern. As such, various patterns may be defined according to the length and placement of a pattern. In a case of representing each of a plurality of image frames as I1, I2, I3 . . . I10, if the pattern frame is placed between a plurality of image frames according to the first pattern, the result may be denoted as I1BI2WI3BI4WI5BI6WI7BI8WI9BI10. That is, the plurality of image frames may be reconfigured in such a format where a black frame is placed between the first image frame and second image frame, and a white frame is placed between the second image frame and third image frame.

As such, the control unit 120 may control the signal processing unit 110 to interleave a pattern frame between a plurality of image frames and reconfigure the plurality of image frames according to a predetermined pattern information. The predetermined pattern information may be information for the external apparatus 200 to identify the display apparatus 100. For example, the aforementioned first pattern BWBWBWBW may be the identification information of display apparatus 100 A, and the second pattern BBBWW-WBBWWBW may be the identification information of display apparatus 100 B.

Meanwhile, since another viewer of the display apparatus 100 should become able to view an entire image, the control unit 120 controls the aforementioned frame rate converter to convert the frame rate. That is, in a case where a pattern frame is interleaved between all image frames in the display apparatus 100 having a frame rate of 60 Hz, the frame rate is readjusted to 120 Hz.

The control unit 120 controls the display unit 130 to display the reconfigured image frame and pattern frame. In the aforementioned exemplary embodiment, the display unit 130 also increases the output rate to twofold.

Herein, detailed explanation of the hardware and software configuration of the control unit 120 is omitted. This part will be supplemented in the explanation on the user terminal apparatus 200 to be made hereinafter. A control unit 120 of a general D-TV does not include a complicated configuration, but in a case where the display apparatus 100 has a similar structure as a computer, it would include a configuration similar to the configuration of the user terminal apparatus 200 to be mentioned hereinafter. The present disclosure does not exclude the exemplary embodiment of this case.

The display unit 130 displays multimedia contents, images, video and text etc. by a control of the control unit 120. More particularly, the display unit 130 displays the plurality of image frames and pattern frames reconfigured by the signal processing unit 110. As aforementioned, in such a case, the display unit 130 increases the output rate to prevent the displaying of existing image frames being delayed. Detailed explanation of the hardware configuration of the display unit 130 will be made in the following exemplary embodiment.

Figure 3:
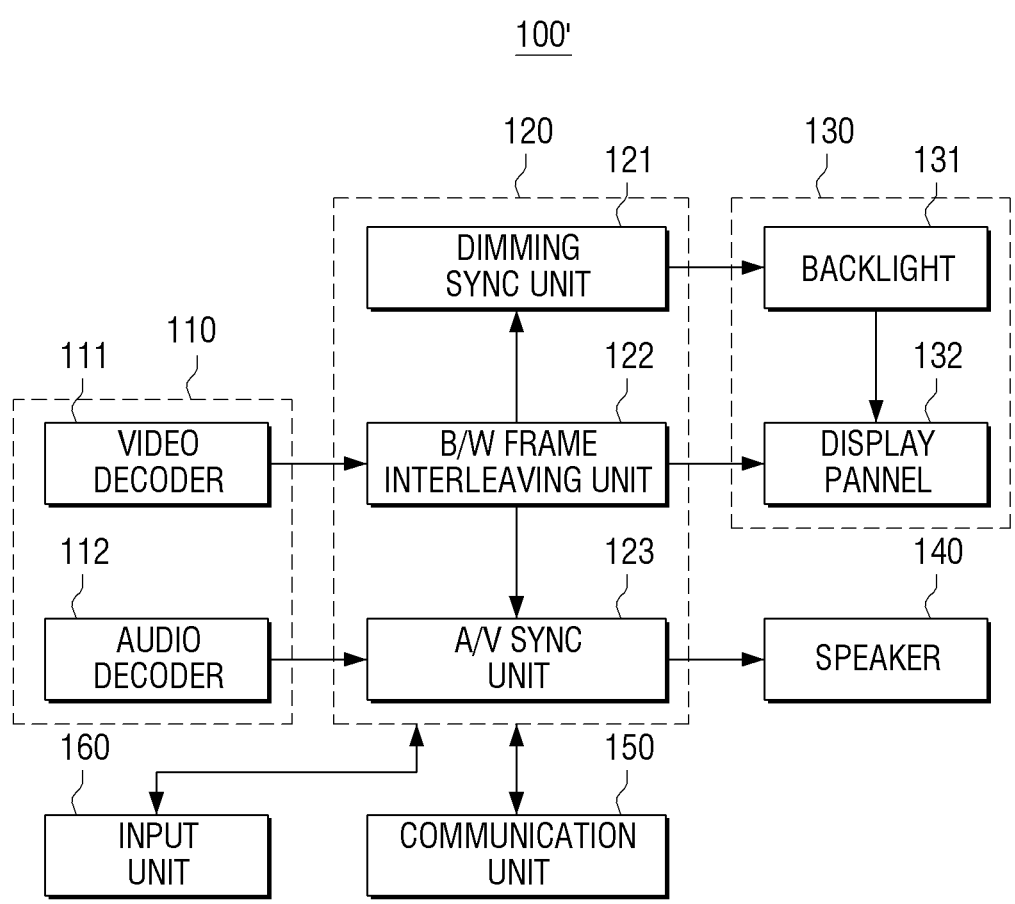
FIG. 3 is a block diagram illustrating a configuration of a display apparatus according to another exemplary embodiment of the present disclosure.

FIG. 3 is a block diagram illustrating configuration of a display apparatus 100 according to another exemplary embodiment of the present disclosure.

With reference to FIG. 3, the display apparatus 100 according to another exemplary embodiment of the present disclosure includes a signal processing unit 110, control unit 120, display unit 130, speaker 140, input unit 160 and communicator 150.

The signal processing unit 110 processes signals related to image data and configures a plurality of image frames. As illustrated in FIG. 3, the signal processing unit 110 may include a video decoder 111 and audio decoder 112. In addition, as in the aforementioned exemplary embodiment, the signal processing unit 110 may include at least one of a scaler, frame rate converter and video enhancer. Explanation on each of the configurations have already been made in the aforementioned exemplary embodiment, and thus detailed explanation will be omitted.

The input unit 160 is a configuration of receiving image contents. The input unit 160 may receive contents from a web server which transmits contents files using a broadcasting station or internet transmitting broadcasting program contents using broadcasting networks. In addition, the input unit 160 may receive contents from various record medium replay apparatuses provided within or connected to the display apparatus 100. Herein, the record medium replay apparatus refers to an apparatus which replays contents stored in various types of record media such as a compact disc (CD), digital versatile disc (DVD), hard disk, Blueray disk, memory card, and a universal serial bus (USB) memory etc.

In a case of receiving contents from a broadcasting station, the input unit 160 may further include a tuner (not illustrated). On the other hand, in an exemplary embodiment of receiving contents from a source such as a web server, the input unit 160 may be embodied as a network interface card (not illustrated). In this case, the input unit 160 is connected to Ethernet or internet to receive contents. In a case of receiving VoD (Video On Demand) contents, the network may support two way communication. In a case of receiving contents from the aforementioned various record medium replay apparatuses, the input unit 160 may be embodied as an interface unit (not illustrated) connected to the record medium replay apparatus. Such an interface unit may include at least one of an audio/video (AV) terminal, computer (COMP) terminal, high definition multimedia interface (HDMI) terminal and USB terminal.

The communication unit 150 is a configuration which is connected to another external apparatus and performs data transceiving. The communication unit 150 may include all wired or wireless communication means, but a wireless communication means may be used as well.

As an exemplary embodiment, a broadcasting communication module may receive broadcasting signals (for example TV broadcasting signals, radio broadcasting signals or data broadcasting signals) and information (for example EPS (Electric Program Guide) or ESG (Electric Service Guide)) transmitted from a broadcasting station through a broadcasting communication antenna according to a control by the control unit 120. The display apparatus 100 extracts contents data included in the received broadcasting signals and performs the aforementioned signal processing.

In addition, the wireless communication means may include a connector. In this case, it may transmit or receive data to or from a peripheral apparatus. As aforementioned, the connector may be included in the input unit 160.

The connector is a configuration which provides interfaces with various apparatuses such as a USB (Universal Serial Bus) 2.0, USB 3.0, HDMI (High-Definition Multimedia Interface), IEEE (Institute of Electrical and Electronics Engineers) 1394 etc. The connector may be used as an interface for connecting the display apparatus 100 with a peripheral apparatus or power source. According to control by the control unit 120, data stored in the storage unit of the display apparatus 100 may be transmitted to the peripheral apparatus or may be received from the peripheral apparatus through a wired cable connected to the connector. Furthermore, through the wired cable connected to the connector, power may be input to or charge a battery (not illustrated) from the power source.

Besides, according to operations of the display apparatus, the communication unit 150 may include at least one of various short-distance communication modules, wireless LAN modules, and global positioning system (GPS) communication modules.

The display unit 130 displays multimedia contents, images, videos, texts etc. by the control of the control unit 120. In particular, as aforementioned, the display unit 130 displays the plurality of images frames and pattern frames reconfigured by the signal processing unit 110. The image frames configured by the signal processing unit 110 are transmitted to the image output circuit and are displayed on the display panel 132.

Hereinbelow is explanation on the configuration of the image output circuit of the display unit 130.

Figure 4:
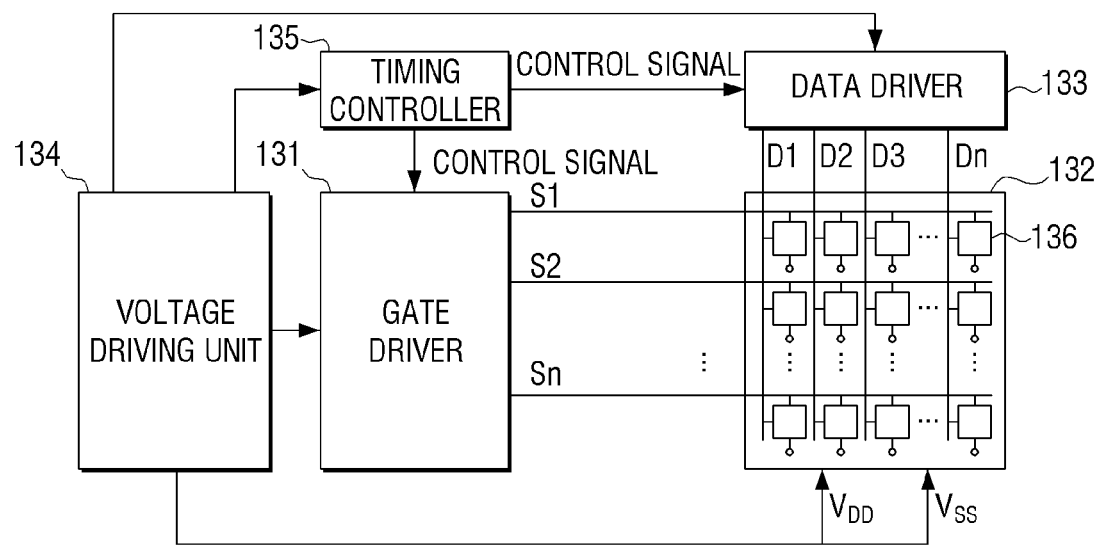
FIG. 4 is a view illustrating a configuration of an image output circuit of a display unit.

FIG. 4 is a view illustrating the configuration of the image output circuit of the display unit 130.

According to FIG. 4, the image output circuit of the display unit 130 may include a timing controller 131, gate driver 137, data driver 133, voltage driving unit 134, and display panel 132.

The timing controller 135 receives a clock signal (DCLK) fit to the definition of the touch screen unit, a horizontal sync signal (Hsync), and vertical sync signal (Vsync) etc. from outside, to create a gate control signal (injection control signal), data control signal (data signal), and realigns the received R, G, B data and provides the realigned data to the data driver 133.

Regarding the aforementioned gate control signal, the timing controller 135 may generate a gate shift clock (GSC), gate output enable (GOE), gate start pulse (GSP) etc. wherein GSC is a signal which determines when to turn on/off a thin film transistor (TFT) connected to a light emitting diode such as R, G, B organic light emitting diode (OLED), GOE is a signal controlling output of the gate driver 137, and GSP is a signal which informs a first driving line on screen in one vertical sync signal.

In addition, regarding the data control signal, the timing controller 135 may generate source sampling clock (SSC), source output enable (SOE), source start pulse (SSP) etc. Herein, SSC is used as a sampling clock for latching data in the data driver 133, and determines the driving frequency of the data drive IC. SOE transmits the data latched by SSC to the display panel 132. SSP is a signal which informs the latching or sampling time of the data during one horizontal sync period.

The gate driver 137 is a configuration which generates injection signals and which is connected to the display panel 132 through injection lines (S1, S2, S3, . . . , Sn). The gate driver 137 approves gate on/off voltage (Vgh/Vgl) provided from the voltage driving unit 134 to the display panel 132 according to the gate control signal generated by the timing controller 135. The gate on voltage (Vgh) is sequentially provided from gate line 1 (GL1) to gate line N (GLn) to embody a unit frame image on the display panel 132.

The data driver 133 is a configuration of generating data signals, and is connected to the display panel 132 through data lines (D1, D2, D3, . . . , Dm). The data driver 133 completes scaling according to the data control signals generated by the timing controller 135 and inputs the RGB data of the video image frames to the display panel 132. The data driver 133 converts the image data of RGB provided in serial as parallel data, converts digital data to analog voltage, and provides image data corresponding to one horizontal line to the display panel 132. This process in made sequentially per each horizontal line.

The voltage driving unit 134 generates and transmits driving voltage to each of the gate driver 137, data driver 133, and display panel 132. That is, the voltage driving unit 134 may be provided with prevailing power from outside such as alternating current of 110V or 220V, or generate and transmit source voltage (VDD) necessary for the display panel 132, or provide ground voltage (VSS). Furthermore, the voltage driving unit 134 may generate gate on voltage (Vgh) and provide the generated gate on voltage (Vgh) to the gate driver 137. To this end, the voltage driving unit 134 may include a plurality of voltage driving modules (not illustrated) which operate individually. Herein, the plurality of voltage driving modules (not illustrated) may operate to provide different voltages according to the control of the control unit 120, and the control unit 120 may control the voltage driving unit 134 so that the plurality of voltage driving modules can provide different driving voltages according to the predetermined information. For example, each of the plurality of voltage driving modules may provide different first voltages and second voltages set as default according to the predetermined information according to the control of the control unit 120.

According to an exemplary embodiment, the voltage driving unit 134 may include a plurality of voltage driving modules corresponding to each area of the display panel 132 divided into a plurality of areas. In such a case, the control unit 120 may control the plurality of voltage driving modules to provide different first voltages, that is, ELVDD voltages according to screen information (or input image information) of each of the plurality of areas. That is, the control unit 120 may control the size of the ELVDD voltage using the image signals input to the data driver 133. Herein, the screen information may be at least one of brightness and grayscale information of the input image.

The display panel 132 may form a plurality of gate lines (GL1~GLn) and data lines (D1~Dn) for crossing each other and defining pixel areas, and in the crossing pixel area 136, light emitting diodes of R, G, B such as OLED may be formed. In addition, in one area of the pixel area 136, more specifically, in an edge thereof, a switching element, TFT, is formed. During a turn-on operation of the TFT, grayscale voltage is provided to each of R, G, B light emitting diodes from the data driver 133. Herein, the light emitting diodes of R, G, B provide light corresponding to the current volume provided based on the grayscale voltage. That is, when a large volume of current is provided, the light emitting diodes of R, G, B provide that amount of light.

Figure 5:
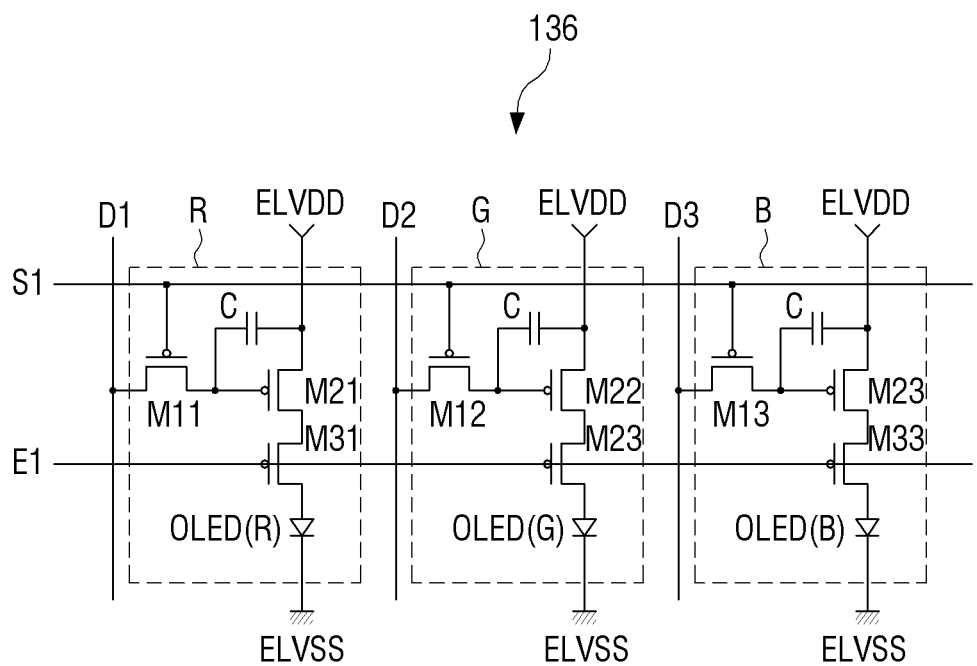
FIG. 5 is a view for explaining a structure of a circuit which configures R, G, B pixels of the display panel of FIG. 4.

FIG. 5 is a view for explaining a circuit structure which configures the R, G, B pixels of the display panel of FIG. 4.

With reference to FIG. 5, the display panel 132 includes three R, G, B pixel areas 136. The R, G, B pixel area 136 may include a scan signal S1, switching elements M11, M21, M31 which operate by the gate on voltage (Vgh), switching elements M12, M22, M23 which output current based on the pixel value which includes a changed high grayscale value provided to the data lines DL1~DLn, and switching elements M13, M23, M33 which adjust the current volume provided from the switching elements M12, M22, M23 to the light emitting diodes of R, G, B according to the control signal provided from the timing controller 135. In addition, these switching elements M13, M23, M33 are connected to the organic light emitting diode (OLED) and supplies current to the OLED. Herein, the OLED refers to the display which emits light itself using the electric field light emitting principle when current flows through a fluorescent or phosphorescence organic material thin film. Anode electrode of OLED is connected to the pixel circuit, and cathode electrode is connected to ELVSS. Such OLED generates light of a predetermined brightness in response to the current provided from the pixel circuit. Herein, the gate electrode of the switching elements (M11, M21, M31 are connected to the injection line S1, and at least one of the source electrode and drain electrode is connected to the data line D1. As such, the display panel 132 may be embodied as an AM-OLED (Active Matrix Organic Light-Emitting Diode). However, the aforementioned exemplary embodiment is just an exemplary embodiment, and of course PM OLED (Passive Matrix Organic Light-Emitting Diode) which is a method of emitting light at the same time for operation cannot be excluded.

As such, in the case of embodying OLED as the display unit 130, it is unnecessary to provide additional light emitting means (backlight), and thus the display apparatus 100 has become thinner and lighter. In addition, there is an advantage of simplifying the configuration as well.

Although OLED was explained in the above exemplary embodiment, the display unit 130 may be embodied as various display technologies such as a liquid crystal display panel (LCD panel), plasma display panel (PDP), VFD (Vacuum Fluorescent Display), FED (Field Emission Display), ELD (Electro Luminescence Display) etc. In addition, if may also be embodied as a flexible display, transparent display etc.

In a case where the display unit 130 is not embodied as OLED, the display unit 130 may further include backlight 131. The backlight 131 may be embodied to supply a light source to the display panel, as a direct type and edge type according to the placement format. A dimming sync unit 121 of the control unit 120 controls a dimming signal of the backlight 131 in accordance with the authorized signal of the image data.

The control unit 120 controls the overall operations of the display apparatus 100 as aforementioned. The control unit 120 may include a dimming sync unit 121, frame interleaving unit 122, and A/V sync unit 123.

The dimming sync unit 121 is a configuration of synchronizing the output timing of the image data with the dimming signal of the backlight 131. That is, in the case of interleaving the pattern frame between the plurality of image frames according to the predetermined pattern information, since other viewers of the display apparatus 100 has to be able to view intact video, the control unit 120 controls the aforementioned frame rate converter to convert the frame rate. For example, in the case of interleaving a pattern frame between all image frames in the display apparatus 100 having a frame rate of 60 Hz, the frame rate is readjusted to 120 Hz. In addition, the display unit 130 increases the output rate to twofold as well. Accordingly, the dimming sync unit 121 changes and synchronizes the operating timing of the backlight 131 according to the changes of the output timing of the image frame and pattern frame.

The B/W frame interleaving unit 122 is a configuration of controlling the signal processing unit 110 to interleave the pattern frame between the plurality of image frames. The B/W frame interleaving unit 122 interleaves a pattern frame between the plurality of image frames to reconfigure the plurality of image frames, and the predetermined pattern information may be information for an external apparatus to identify the display apparatus 100. Other operations of the B/W frame interleaving unit 122 are identical to those of the aforementioned exemplary embodiment.

The A/V sync unit 123 performs synchronization of the audio output signal and video output signal (image output signal). As aforementioned, since the pattern frame is interleaved between the plurality of image frames and the frame rate is changed, it may be necessary to synchronize the audio output signal accordingly. The audio output signal synchronized by the A/V sync unit 123 is output to the outside of the display apparatus 100 through the speaker 140.

The dimming sync unit 121, frame interleaving unit 122, and A/V sync unit 123 may be configured as hardware chips, or may be provided as an application which operates in an OS or framework. In the case where these configurations are provided as an application, each configuration operates as a software module.

As such, the display apparatus 100 according to various exemplary embodiments becomes able to provide the pattern information to other apparatuses by interleaving the pattern frame between the plurality of image frames and by displaying the plurality of image frames which include such pattern frames. Herein, the other apparatus may be the user terminal apparatus 200 of which the operations and configurations thereof will be explained hereinbelow.

Configurations and Operations of the User Terminal Apparatus

Figure 6:
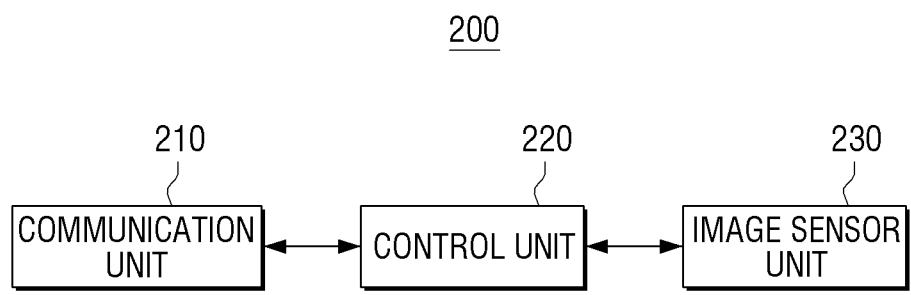
FIG. 6 is a block diagram illustrating a configuration of a user terminal apparatus according to another exemplary embodiment of the present disclosure.
Figure 7:
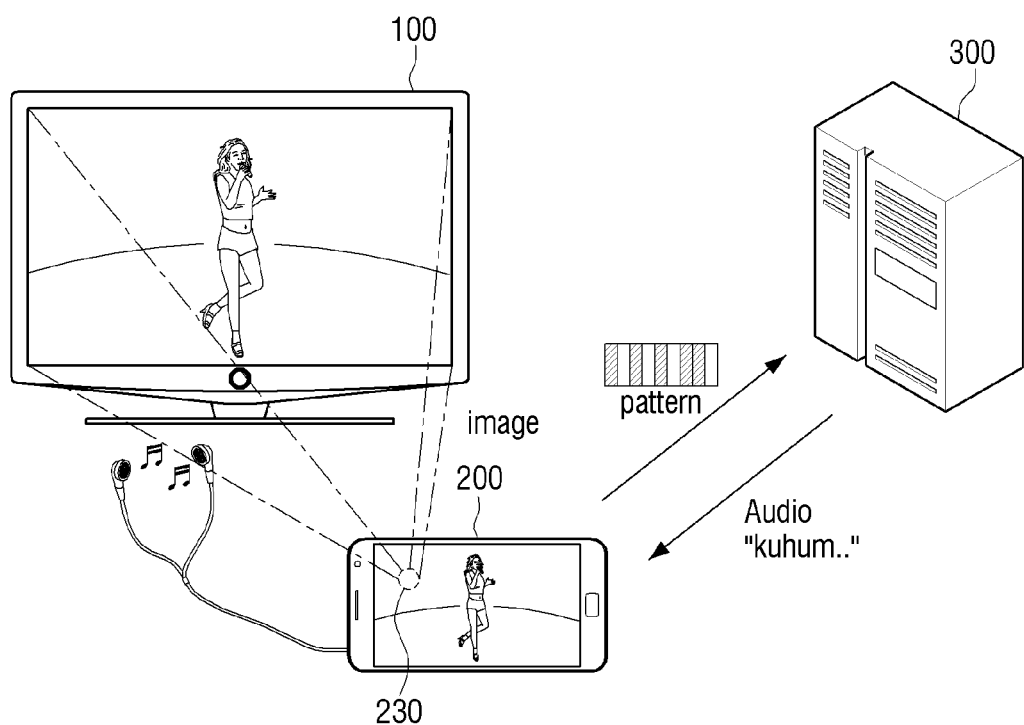
FIGS. 7 and 8 are views illustrating a situation where a user terminal apparatus receives data related to a display apparatus according to various exemplary embodiments of the present disclosure.
Figure 8:
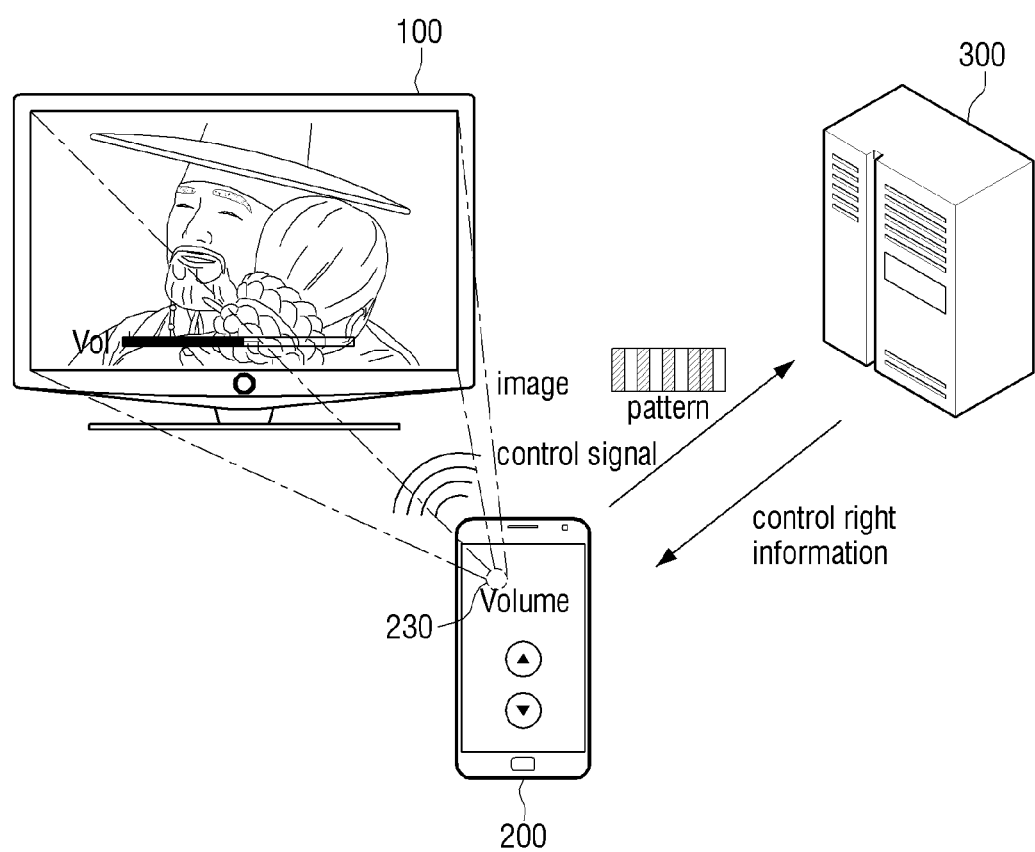
Figure 9:
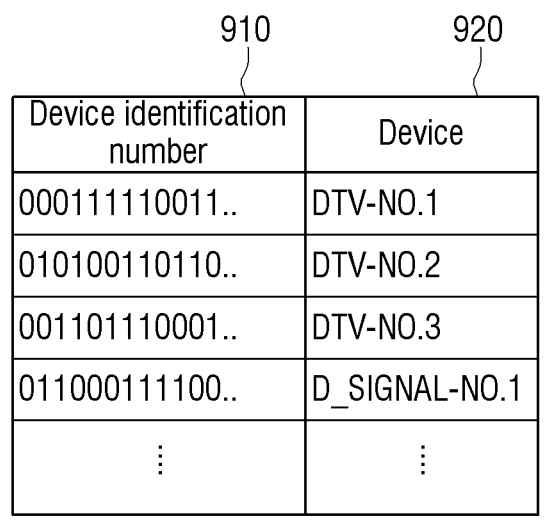
FIG. 9 is a view illustrating a chart illustrating device identification information which match various patterns.

FIG. 6 is a block diagram illustrating a configuration of the user terminal apparatus 200 according to an exemplary embodiment of the present disclosure. FIGS. 7 and 8 are views illustrating a situation where the user terminal apparatus 200 receives data related to the display apparatus 100, and FIG. 9 is a view illustrating a chart which shows apparatus identification information matching various patterns.

In the present specification, the user terminal apparatus 200 is an apparatus which has one or more displays and which is configured to execute applications or display contents. For example, the user terminal apparatus 200 may be embodied as one of a tablet personal computer (PC), portable multimedia player (PMP), personal digital assistant (PDA), smart phone, mobile phone, and digital photo frame. Hereinbelow, explanation will be made in the case where the user terminal apparatus 200 is embodied as a smart phone.

With reference to FIG. 6, the user terminal apparatus 200 according to an exemplary embodiment of the present disclosure includes a communication unit 210, control unit 220, and image sensor unit 230.

The communication unit 210 is a configuration of performing communication with the external apparatus 300. More specifically, the user terminal apparatus transceives pattern information to and from the external apparatus 300 through a short-distance communication network or long-distance communication network, or receives data related to the display apparatus 100. Herein, the external apparatus 300 may be at least one of a server, Access Point (AP), and another user terminal apparatus 200.

An exemplary embodiment where the external apparatus 300 is a server will be explained hereinbelow. The user terminal apparatus 200 communicates with an access point (AP) with a short-distance communication network. In addition, the user terminal apparatus 200 transceives data with the server through the access point (AP). In an exemplary embodiment, the user terminal apparatus 200 does not have mobility, and performs wireless communication with the access point located nearby. On the other hand, the access point and server may be connected by a wired communication means including the internet.

The communication unit 210 may be embodied by various short-distance communication technologies. For example, the communication unit 210 may conform to the Wifi communication standard. In this case, the communication unit 210 includes Wifi modules.

Wifi modules perform short-distance communication which conforms to the IEEE 802.11 technology standard. According to the IEEE 802.11 technology standard, the wireless communication technology of the spread spectrum method called DSSS (Single Carrier Direct Sequence Spread Spectrum), and the wireless communication technology of the direct frequency division method called OFDM (Multi Carrier Orthogonal Frequency Multiflexing) are used. That is, noise signals are tuned by spread spectrum to perform data transmission, and a direct plurality of frequencies are used to perform massive data transmission. In the case of conforming to the IEEE 802.11n standard, it is possible to transmit up to 150 Mbps of data, and when applying MIMO (multiple-input and multiple-output) technology which uses plurality of antenna to increase output, it is possible to transmit up to 600 Mbps of data.

In another exemplary embodiment, the communication unit 210 may be embodied by various mobile communication technologies. That is, an existing wireless telephone network may be used to include cellular communication modules which enable data transceiving.

For example, 3G ($3^{rd}$ generation) mobile communication technologies may be applied. That is, at least one of WCDMA (Wideband CDMA), HSDPA (High Speed Downlink Packet Access), HSUPA (High Speed Uplink Packet Access) and HSPA (High Speed Packet Access) may be applied. In the case of HSPA, up to 14.4 Mbps can be downloaded, and up to 5.8 Mbps may be uploaded.

Otherwise, 4G (4th generation) mobile communication technologies may be applied. 2.3 GHz (portable internet) Mobile WiMAX or Wibro are technologies which are recently gathering attention as internet technologies that can be used even when moving at high speed. These have the advantages of $3^{rd}$ generation mobile communication technologies (HSPA) and wireless LAN, and thus have up to 180 Mbps transmission speed. In addition, 4th generation LTE (Long Term Evolution) technology may be applied. LTE is an expanded technology of WCDMA, and is based on OFDMA (Orthogonal Frequency Division Multiple Access) and MIMO (Multiple-Input Multiple-Output) technologies. It is a technology which utilizes WCDMA technology, and thus there is an advantage that it may utilize the existing network. It shortens the signal delay time to 1 ms which is 2 ms faster than HSPA, and guarantees speed while moving up to 350 km/h. The aforementioned 4th generation mobile communication technologies are based on adopting OFDMA as wireless access methods, using 640QAM modulation technique, and multi-antenna technologies etc. Through this, transmission speed is guaranteed while moving, and multimedia communication may be provided.

As aforementioned, the communication unit 210 of the user terminal apparatus 200 of the present disclosure may utilize WIMAX, Wifi, 3G, and LTE etc. which have broad bandwidth and high efficiency, but it doesn't mean that use of other short-distance communication technologies are excluded.

That is, the communication unit 210 may include at least one of the other short-distance communication modules such as Bluetooth modules, IrDA (infrared data association) modules, NFC (Near Field Communication) modules, and Zigbee modules etc., and wireless LAN modules.

Bluetooth modules uses a total of 79 channels between 2402~2480 MHz, excluding the range of 2 MHz after ISM (Industrial Scientific and Medical) 2400 MHz to 3.5 MHz before 2483.5 MHz, to transmit data streams in data packet formats. In the case of using the frequency hopping method of transmitting a packet (data) little by little while quickly moving a plurality of channels along a certain pattern, 79 channels may be hopped 1600 times per second.

Infrared communication modules use infrared rays to transmit data. Infrared rays have longer wavelength than visible rays, and thus infrared rays may penetrate particles floating in the air more smoothly, and particularly, infrared rays may easily secure broad bandwidth than waves, and thus have the advantage of transmitting data at high speed. In the case of conforming to IrDA (Infrared Data Association) DATA 1.4 standard, the user terminal apparatus 100 is capable of performing wireless data communication at a maximum speed of 16 Mbps within a distance less than 1 meter with an external apparatus 300, 200.

NFC communication modules communicate in a non-contact short-distance wireless communication method using 13.56 Mz frequency bandwidth. When using the NFC technology, data may be transceived when a plurality of terminals approach within approximately 10 cm. In this case, the external apparatus 300, 200 may include the modules including NFC tags, and when tagging is made including an NFC reader, data is transmitted from the external apparatus 300 to the user terminal apparatus 200. For information transceiving, each of the external apparatus 300 and user terminal apparatus 200 may include the NFC tag and NFC reader.

A wireless LAN module is a configuration of accessing a wireless AP (access point) existing within the predetermined range and being connected to the internet according to the control of the control unit 220. The wireless LAN module supports of wireless LAN standard IEEE 802.11x of IEEE.

The communication unit 210 may include Zigbee modules. Zigbee is a short-distance communication method conforming to IEEE 802.15.4 technology standard, having transmission speed of 250 Kbps, 20 Kbps, and 40 Kbps. This method is appropriate for a relatively simple data transmission.

As such, the communication unit 210 may be embodied by the aforementioned various communication technologies, and when necessary, other communication technologies not mentioned in this specification may be adopted.

To further explain the configuration of the user terminal apparatus 100, the image sensor unit 230 is a configuration of photographing images. More specifically, the image sensor unit 230 photographs images displayed on the display apparatus 100 at a photographing speed above the frame rate. As such, the reason why the image sensor unit 230 photographs images at a speed above the frame rate is to photograph both the plurality of image frames and the pattern frame interleaved therebetween.

For example, assuming that the display apparatus 100 displays images at a frame rate of 60 Hz, and a pattern frame is interleaved, and then outputs image frames and the pattern frame alternately at a speed of 120 Hz, the image sensor unit 230 may photograph the images frames and pattern frame at a photographing speed above 120 Hz. The control unit 220 extracts the pattern information from the photographed images.

The image sensor unit 230 includes a shutter (not illustrated), lens unit (not illustrated), aperture (not illustrated) and CCD (Charge Coupled Device) image sensor (not illustrated) and ADC (Analog/Digital Converter) (not illustrated). The shutter is an equipment which adjusts the amount of light exposed, together with the aperture. The lens unit receives light from an external light source and process images. Herein, the aperture adjusts the amount of light entered according to the degree of opening of the aperture. The CCD image sensor accumulates the light volume being entered through the lens unit, and outputs images photographed in the lens unit in accordance with the vertical sync signals according to the accumulated light volume. Obtaining images is performed by the CCD image sensor which converts light reflected from the subject into electric signals. In order to obtain color images using the CCD image sensor, a color filter is required. A CFA (Color filter array) filter may be adopted. The CFA has a regularly arranged structure and only penetrates light which express only one color for each pixel. And the CFA has various shapes depending on the arrangement structure. An ADC converts analog image signals being output from the CCD image sensor into digital signals.

Meanwhile, the image sensor unit 230 photographing images as aforementioned is only an exemplary embodiment, and thus images may be photographed by other methods as well. For example, images may be photographed using a CMOS (Complementary Metal Oxide Semiconductor) image sensor instead of the CCD image sensor.

The image processing unit (not illustrated) of the user terminal apparatus 200 processes signals so that raw data that has been digitally converted can be displayed by the control of the control unit 220. The image processing unit (not illustrated) removes the CCD image sensor sensitive to temperature and black level by dark current generated in the Color filter array (CFA) filter. The image processing unit (not illustrated) performs gamma correction which encodes information according to nonlinearity of human sight. The image processing unit (not illustrated) performs CFA interpolation which interpolates bayer pattern embodied as a RGRG line and a GBGB line of predetermined data that has been gamma corrected into a RGB line. The image processing unit (not illustrated) converts the interpolated RGB signal into a YUV signal, performs edge compensation of making images distinct by filtering Y signals by a high bandwidth filter and color correction of correcting color values of U, V signals using the standard color coordinate system, and removes noise thereof. The image processing unit (not illustrated) compresses and signal processes Y, U, V signals from which noise has been removed to generate JPEG files, and the generated JPEG files are stored in the storage unit 270, 170. Meanwhile, the image processing unit (not illustrated) processing images as aforementioned is merely an exemplary embodiment. Images may be processed by other methods as well.

The control unit 220 controls the overall operations of the user terminal apparatus 200. The control unit 220 provides clock to hardware, and includes a PCU which transmits control signals, a memory for temporarily or semi-permanently storing processes, a GPU for processing graphics, and a system BUS for transmitting data between the memory, CPU and GPU. In addition, it also includes an operating system (OS) for driving the hardware configuration, and an application for providing a user interface to the framework on the operating system.

The control unit 220 identifies pattern information based on the placement situation of the pattern frame included in the image photographed by the image sensor unit 230, and controls to receive data related to the display apparatus 100 from the external apparatus 300 based on the identified pattern information.

As aforementioned, the display apparatus 100 interleaves a pattern frame between a plurality of image frames and displays the result. A pattern frame refers to a frame which may express a pattern through a placement of one or more frames. For example, the pattern frame may be a black frame or white frame. The black frame refers to where the pixel values of all pixels forming a frame correspond to black color or to a frame of a similar case.

A pattern may be expressed through placement of a black frame and white frame. Representing black frame as B, and white frame as W, various patterns may be expressed through a predetermined number of pattern frames. For example, BWBWBWBWBW may be defined as one type of pattern. In addition, BBBWWWBBWWBW may be defined as another type of pattern. As such, various patterns may be defined according to length and placement of patterns. In a case of representing each of a plurality of image frames as I1, I2, I3 . . . I10 if the pattern frame is placed between a plurality of image frames according to the first pattern, the result may be expressed as I1BI2WI3BI4WI5BI6WI7BI8WI9BI10. That is, the plurality of image frames may be reconfigured in such a format where a black frame is placed between the first image frame and second image frame, and a white frame is placed between the second image frame and third image frame.

The control unit 220 identifies the pattern frame in the image photographed by the image sensor unit 230, and identifies the pattern information based on the placement situation of that pattern frame. In the aforementioned exemplary embodiment, the image sensor unit 230 confirms the placement situation of the black frame and white frame in the image photographed by the image sensor unit 230, and extracts pattern information BWBWBWBWBW.

In addition, the control unit 220 controls the communication unit 210 and receives data related to the display apparatus 100 from the external apparatus 300 based on the identified pattern information. Herein, the data related to the display apparatus 100 may be at least one of the audio data and second contents corresponding to the image that the display apparatus 100 outputs.

As an exemplary embodiment, the user of the user terminal apparatus 200 may want the audio data of the image displayed on the display apparatus 100 installed on a street. If sound of the display apparatus 100 installed on the street is turned on, the noise may be annoy people in the street, and thus in many cases only images are output with the sound turned off. Herein, the user interested in the contents being displayed would want the audio data, but as long as the user doesn't have authority to control the display apparatus 100, there is no means to hear the sound.

In this case, the user may use the user terminal apparatus 200 to photograph the display image of the display apparatus 100 and manipulate the user terminal apparatus 200, in which case the control unit 220 could control to receive the audio data corresponding to the image that the display apparatus 100 outputs from the external apparatus 300 (for example, server). Therefore, as in FIG. 7, the user becomes able to listen to the sound of the image that the display apparatus 100 outputs and easily obtain information that he/she wants through an earphone attached to the user terminal apparatus 200.

As another exemplary embodiment, the user of the user terminal apparatus 200 may want to watch the full version preview of a movie advertisement displayed on a digital signage installed in a lobby of a multiplex. Advertisement images of a digital signage may have limited display time due to legal or cost limitations, and thus there may be limitations in providing sufficient movie information.

Herein, when the user who wants a full version preview, photographs the display image of the display apparatus 100 using the user terminal apparatus 200 and manipulates the user terminal apparatus 200, the control unit 220 controls to receive the second contents of the image that the display apparatus 100 outputs from the external apparatus 300 (for example, the server) based on the pattern information included in the photographed image. Therefore, the user becomes able to watch the full version of the movie preview that the display apparatus 100 outputs through the user terminal apparatus 200.

In another exemplary embodiment of the present disclosure, the data related to the display apparatus 100 may be information for obtaining control authority regarding the display apparatus 100.

In the aforementioned first exemplary embodiment, the user of the user terminal apparatus 200 may want to turn up the volume himself/herself through the control of the display apparatus 100 and hear the sound. When the user uses the user terminal apparatus 200 to photograph the display image of the display apparatus 100 and manipulate the user terminal apparatus 200, the control unit 220 may control to receive the information to obtain the control authority regarding the display apparatus 100 from the external apparatus 300 (for example, the server) based on the pattern information included in the photographed image.

For example, such information may be a software application which includes control modules. The control unit 220 executes the application and transmits the display apparatus 100 control signals by the user manipulation to the same frequency of the remote frequency of the remote control of the display apparatus 100. For example, in a case where the user manipulates the user terminal apparatus 200 to input a command to increase the volume, the control unit 220 transmits the control signal corresponding to the command to the display apparatus 100. Therefore, as in FIG. 8, the user becomes able to use the user terminal apparatus 200 to adjust the sound of the image that the display apparatus 100 outputs.

In an extended exemplary embodiment of the present disclosure, the control unit 220 may control the communication unit 210 to transmit the pattern information identified as aforementioned to the external apparatus 300. In addition, the control unit 220 controls to receive data related to the display apparatus 100 from the external apparatus 300.

The user terminal apparatus 200 according to another exemplary embodiment of the present disclosure may further include a storage unit 270 which stores equipment identification information corresponding to the predetermined pattern information. In this exemplary embodiment, the predetermined pattern information may be mapped with identification information of the equipment such as the display apparatus 100. That is, the pattern information included in the image that the display apparatus 100 displays may correspond to the identification information of that display apparatus 100. In the aforementioned exemplary embodiment, in the case where the display apparatus 100 which displays the pattern information BWBWBWBWBW sets 0 as the number which corresponds to B and sets 1 as the number which corresponds to W, the pattern information may correspond to the identification information of 0101010101. The equipment identification information of the display apparatus 100 may be 0101010101.

FIG. 9 illustrates a chart which shows equipment identification information 910 matching various patterns and a device 920 corresponding to the equipment identification information 910. According to FIG. 9, the device DTV-No. 1 represents equipment identification information 000111110011 . . . , while device DTV-No. 2 represents equipment identification information 010100110110 . . . . Such equipment identification information corresponds to the pattern information displayed by each device. As in the above exemplary embodiment, in the case of setting the frame which corresponds to 0 as the black frame and the frame which corresponds to 1 as the white frame, DTV-No. 1 will display the pattern information of BBBWWWWWBB WW . . . and DTV-No. 2 will display the pattern information of BWBWBBWWBWWB . . . .

Herein, the aforementioned control unit 220 may read the equipment identification information 910 mapped with the identified pattern information from the storage unit 270, and control to transmit the read equipment identification information to the external apparatus 300. Then, the external apparatus 300 identifies the display apparatus 100 based on the received equipment identification information, and transmits the data related to the identified display apparatus 100 to the user terminal apparatus 200. Herein, the operations of the user terminal apparatus 200 are as aforementioned.

Other configurations and operations of the user terminal apparatus 200 will be explained hereinbelow.

Figure 10:
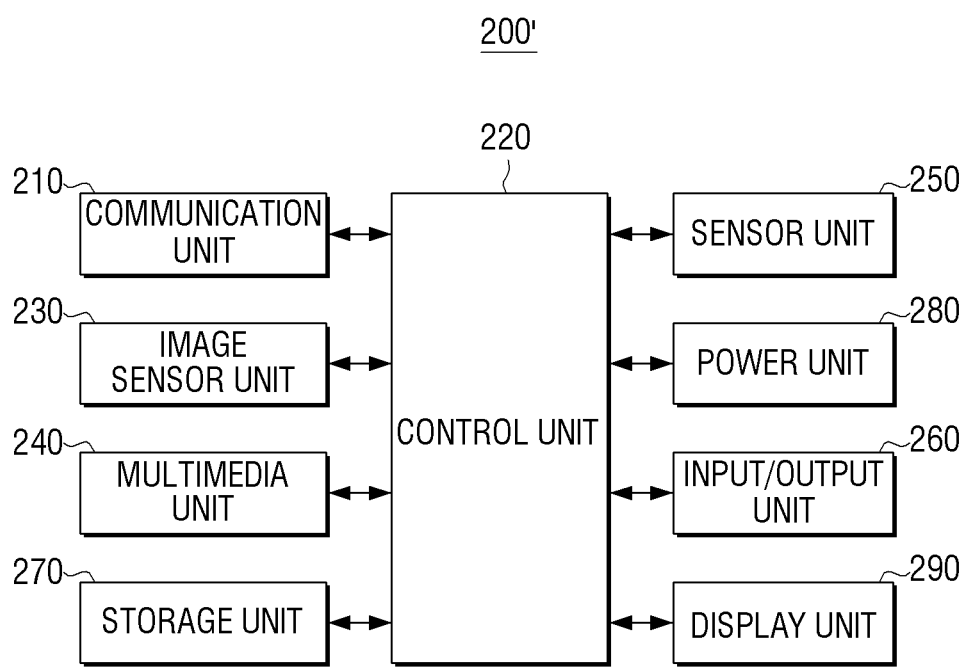
FIG. 10 is a block diagram illustrating a configuration of a user terminal apparatus according to various exemplary embodiments of the present disclosure.

FIG. 10 is a block diagram of the configuration of the user terminal apparatus 200 according to various exemplary embodiments of the present disclosure.

With reference to FIG. 10, the user terminal apparatus 200 according to various exemplary embodiments of the present disclosure includes an image sensor unit 230, multimedia unit 240, storage unit 270, sensor unit 250, power unit 280, input/output unit 260, display unit 290 and control unit 220. Explanation on the communication unit 210 and image sensor unit 230 has been aforementioned, and repeated explanation is omitted.

The multimedia unit 240 is a configurative element for replaying video contents, audio contents and other various multimedia contents. The multimedia unit 240 uses a parser or codec etc. to process the multimedia contents, and performs contents replay. The multimedia unit 240 includes an audio replay module (not illustrated) and video replay module (not illustrated).

The audio replay module may replay a digital audio file (for example, a file having an extension of mp3, wma, ogg or wav) which is stored or received according to the control of the control unit 220. The video replay module (not illustrated) may replay a digital video file (for example, a file having an extension of mpeg, mpg, mp4, avi, mov, or mkv) which is stored or received according to the control of the control unit 220.

The video replay module supports various formats of codec so as to replay the digital video file. That is, it replays the video file by the prestored codec so as to fit the codec format of the video file to be replayed. In addition, the audio replay module or the video replay module of the multimedia module may be included in the control unit 220.

In the aforementioned exemplary embodiment, the user terminal apparatus receives video contents or audio contents from the external apparatus 300. In addition, audio replay modules replays the received audio data in the user terminal apparatus 200 and outputs sound through the speaker or earphone. The video replay module replays the received video data and displays it one the display panel of the aforementioned display unit 290.

The sensor unit 250 is a configurative element for sensing various situation changes such as a user touch of the user terminal apparatus 200, user movement, and movement of the user terminal apparatus itself 200. The sensor unit 250 may include at least one of a touch sensor (not illustrated), geomagnetic sensor (not illustrated), acceleration sensor (not illustrated), and approximate sensor (not illustrated).

The touch sensor (not illustrated) is a sensor which may sense a contact of a user object to the display unit 290 of the user terminal apparatus 200. That is, the touch sensor refers to a sensor which touches the display unit 290 by a sensible input means or body such as fingers to sense an input of selecting the object displayed on the display screen. The touch sensor may be embodied as at least one of a capacitive method and piezoelectric method according to the method of sensing the user's touch. The touch sensor may be included in the display unit 290 together with the display panel.

The geomagnetic sensor (not illustrated) is a sensor which is capable of sensing azimuth angles by detecting flow of a magnetic field. The geomagnetic sensor detects angle coordinates of the user terminal apparatus 200, and detects directions in which the user terminal apparatus 200 is placed based on the angle coordinates. The placed directions are perceived as control inputs corresponding thereto and the control unit 220 performs output corresponding thereto.

The acceleration sensor (not illustrated) is a sensor which detects the acceleration of the user terminal apparatus 200. The acceleration sensor sets x, y, z axes on the user terminal apparatus 200, and detects acceleration of gravity which changes according to the inclined degree of each axis. The acceleration sensor may be utilized in detecting the acceleration of gravity besides detecting the acceleration (dynamic acceleration) of a moving object.

Besides the above, the sensor unit 250 may further include at least one of a gravity sensor which may detect in which direction gravity is applied, gyro sensor which may add rotation to an existing acceleration sensor to perceive a total of 6 axes, an orientation sensor which may automatically sense a length and width frame of contents such as an image and automatically rotate or align contents, illuminance sensor which detects amount of light around the user terminal apparatus 200, altitude measuring sensor which measures atmospheric pressures, RGB sensor which detects colors of objects, distance measuring sensor which measures distances using ultrasonic waves or infrared rays, and hall sensor which uses changes of voltage according to an intensity of a magnetic field. In addition, the aforementioned image sensor unit 230 may be included in the sensor unit 250, but in the present specification, it is separately explained for convenience of explanation.

The sensor unit 250 may detect a situation of each sensor, generate a signal corresponding to the detection, and transmit the generated signal to the control unit 220. The control unit 220 performs a corresponding output or calculation using the received sensor signal. Each sensor of the sensor unit 250 may be added or deleted according to the performance of the user terminal apparatus 200.

The input/output unit 260 is a configurative element for performing input/output using a screen or other external connecting port. More specifically, the input/output unit 260 may receive an input signal transmitted from an input means such as a mouse, keyboard, joystick connected to the user terminal apparatus 200, or from a wireless input means such as a remote control, and transmit the received input signal to the control unit 220. Otherwise, the input/output unit 260 may output various signals or data generated by the control unit 220 to a peripheral apparatus. The input/output unit includes a microphone, speaker, and vibration motor.

At least one button unit (not illustrated) may be formed in a front, side, or back surface of a housing in a push or touch type, and may include at least one of a power/lock button, volume adjusting button, menu button, home button, back button and search button etc. When the button unit is pressed, a corresponding control command is generated and transmitted to the control unit 220, and the control unit 220 controls operations of the user terminal apparatus 200 according to the corresponding control command.

The user may manipulate the button unit (not illustrated) to photograph the image displayed on the display apparatus 100 through the aforementioned image sensor unit 230. However, besides manipulating the button unit, a touch screen may be touched, or the user terminal apparatus 200 may perceive a gesture of the user and transmit an image photographing command to the control unit 220.

According to a control of the control unit 220, the microphone (not illustrated) receives voice or sound and generates electric signals.

The speaker (not illustrated) may output a cellular communication module (not illustrated), wireless LAN module (not illustrated), short-distance communication module (not illustrated), multimedia unit 240 (not illustrated), or sound corresponding to various signals (for example, wireless signals, broadcasting signals, digital audio signals, digital video files or photographs) to the outside of the user terminal apparatus 200.

The speaker (not illustrated) may output sound (for example, button manipulating sound corresponding to a telephone call or message) corresponding to the function that the user terminal apparatus 200 perform. The speaker may be formed in singular or plural at appropriate location or locations of the housing. For example, the speaker has an internal speaker module located at an appropriate place to approach the user's ears, and an output higher than what is appropriate to be used when replaying or viewing broadcasting of an audio/video file, and may be configured to include external speaker modules placed at appropriate locations of the housing of the user terminal apparatus 200.

The vibration motor (not illustrated) may convert electric signals to mechanical vibration according to the control of the control unit 220. For example, when a voice call is received from another apparatus (not illustrated), if the user terminal apparatus 200 in a vibration mode, a vibration motor operates. The vibration motor may be formed in singular or plural within the housing of the user terminal apparatus 200. The vibration motor may operate in response to a sequential movement of the user's touch gestures or touches sensed on the display unit 290.

In addition, in the aforementioned exemplary embodiment, when the user terminal apparatus 200 receives data related to the image displayed on the display apparatus 100, the vibration motor may operate for the purpose to inform reception of data from the external apparatus 300.

The storage unit 270 is a configuration of storing data.

First, the storage unit 270 stores an operating system program for controlling operations of the user terminal apparatus 200. The stored operating system is read in the storage unit 270 when the user terminal apparatus 200 is turned on, and is compiled to operate each configuration of the apparatus.

Second, the storage unit 270 is managed by the operating system, and uses resources of the operating system to perform operations of the user terminal apparatus 200, and stores the application program which provides the user interface. The application program is read in the storage unit 270 by the operating system according to the users' execution command, and is transferred in an executable state to perform various operations.

Third, the storage unit 270 stores various multimedia data processed by the control unit 220, contents data, and data received from external sources. That is, the storage unit 270 may store input/output signals, information or data in accordance with operations of the cellular communication module, wireless LAN module, short-distance communication module, connector, GPS module, multimedia unit 240, image sensor unit 230, sensor unit 250, input/output unit, and display unit 290 according to the control of the control unit 220.

In particular, the storage unit 270 may store equipment identification information corresponding to the pattern information. In this case, the user terminal apparatus 200 reads equipment identification information mapped to the extracted pattern information from the storage unit 270. In addition, the storage unit 270 transmits the aforementioned read equipment identification information of the external apparatus 300.

Such a storage unit 270 may be embodied as at least one of a memory card (for example, a secure digital (SD) card, or memory stick), nonvolatile memory, volatile memory, hard disk drive (HDD) or solid state drive (SSD) etc. attachable/detachable to/from a read-only memory (ROM), random access memory (RAM), or user terminal apparatus 200.

The power unit 280 supplies power used in the user terminal apparatus 200. The power unit 280 may be embodied as a chargeable battery, and may further include a voltage converter which converts externally supplied power to supply to a chargeable battery.

The power unit 280 may supply power in various modes such as a maximum performance mode, general mode, power-saving mode, standby mode etc. to the user terminal apparatus 200 according to the power management control of the control unit 220.

The aforementioned display unit 290 may include the aforementioned touch sensor, in which case at least one touch gesture may be received through the user's body (for example, through the fingers including the thumb), or sensible input means (for example, a stylus pen).

Such a user interface may include a predetermined touch area, soft key and software menu. The display unit 290 may transmit an electric signal corresponding to at least one touch gesture input through the user interface to the display unit 290 through the LCD controller (not illustrated). In addition, the display unit 290 may sense the continuous movement of touches, and transmit electric signals corresponding to continuous or discontinuous movements of touches to the LCD controller. As aforementioned, the touch sensor may be embodied as a resistive method, capacitive method, infrared method or acoustic wave method.

The display unit 290 converts a sense signal regarding the user's operation sensed through the touch sensor into a digital signal (for example, X and Y coordinates), and transmits the converted digital signal to the control unit 220. The control unit 220 may use the received digital signal to perform control operations corresponding to the user operation input through the display unit 290. For example, the control unit 220 may select a soft key on the display unit 290 or execute an application corresponding to the soft key in response to the user's operation.

The display unit 290 has a similar structure as the display unit 130 of the aforementioned display apparatus 100. However, the display unit 290 may further include a touch screen connected to the touch sensor for user input.

The aforementioned user gesture is not limited to a direct contact between the display unit 290 with the user's body or with a touchable input means, but also includes non-contact method. The sensitivity of the user's operation detectable in the display unit 290 may be changed according to performance or structure of the user terminal apparatus 200.

The hardware structure of the user terminal control unit 220 is explained hereinbelow.

Figure 11:
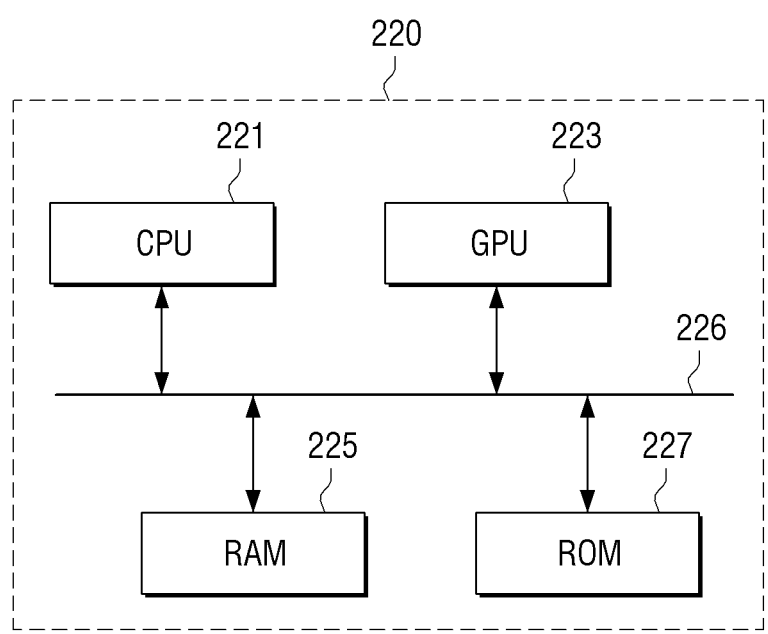
FIG. 11 is a view briefly illustrating a hardware structure of a control unit.

FIG. 11 is a view briefly illustrating the hardware structure of the control unit 220.

With reference to FIG. 11, the CPU 221 controls functions of each block unit while performing data communication with each block unit through the system BUS 226, collects the control results, and transmits a control signal to various peripheral apparatuses connected to the control unit 220 based on the collected control results to control the peripheral apparatuses. In addition, the CPU 221 reads instructions and data arguments of each process in the RAM, and controls the calculation unit to perform calculation.

First of all, the CPU 221 uses booting information prestored in the ROM 227 to perform booting. That is, when the system is turned on, the CPU 221 reads a command for operating each hardware configuration from the ROM 227, and transmits a control signal to each hardware according to the command. In addition, the CPU 221 reads data stored in the hard disk (not illustrated) to the RAM 225 and transmits the data which needs graphic processing of among the data stored in the RAM 225 to the GPU 223. The CPU 221 receives the data graphic processed by the GPU 223, and transmits the graphic processed data to the LCD controller (not illustrated) connected to the system BUS 226 and displays an image of the display unit 290.

Herein, the CPU 221 temporarily stores the image data processed by the GPU 23 in a virtual frame buffer area allocated on a predetermined area of the RAM 225. The CPU 221 allocates each area of the virtual frame buffer to support the maximum resolution (for example 1024×600) of the display unit 290.

The CPU 221 inputs the data temporarily stored in the virtual frame butter to the GPU 223 and performs digital signal processing.

The GPU 223 performs graphic processing on the data input under the control of the CPU 221. More specifically, the GPU 223 uses the calculation unit (not illustrated) and rendering unit (not illustrated) to generate a screen including various objects such as an icon, image, and text etc. The calculation unit calculates attribute values such as a coordinate value, format, size, and color etc. where each object is to be displayed according to a layout of the screen. The rendering unit generates a screen of various layouts including objects based on the attribute value calculated in the calculation unit. The screen generated in the rendering unit is transmitted to the display unit 290 through the system BUS 226 and may be either displayed within the display area or be stored in the storage unit 270.

The CPU 221 may control so that the data graphic processed by the GPU 223 may be displayed through the display unit 290 or be stored in the storage unit 270, or may input the processed data to the display controller (not illustrated).

The GPU 223 may include a decoder, renderer, scaler etc. Accordingly, the GPU 223 decodes the stored contents, renders the decoded contents to configure a frame, and scales the size of the configured frame to fit the size of the display by the control of the display controller (not illustrated). The GPU 223 provides the processed frame to the display unit 290 and displays the processed frame.

The control unit 220 may further include an audio processing unit (not illustrated). The audio processing unit (not illustrated) refers to a configurative element which interfaces with the multimedia unit 240 through the audio interface (not illustrated), and processes audio data and provides the processed audio data to a sound output means such as a speaker. The audio processing unit 270 may decode the audio data received through the audio data or communication unit 210 stored in the storage unit 270, perform noise filtering on the decoded audio data, and perform audio signal processing such as amplifying to appropriate decibel. In the aforementioned exemplary embodiment, in a case where the replayed contents are video contents, the audio processing unit may process the audio data demultiplexed from the video contents with the GPU 223, synchronize the processed audio data with the GPU 223, and provide the synchronized audio data to the speaker.

In the ROM 227, command sets for system booting are stored. When a turn on command is input and power is supplied, the CPU 221 copies O/S stored in the storage unit 270 to the RAM 223, executes the O/S, and boots the system. When the booting is completed, the CPU 221 copies various application programs stored in the storage unit 270 in the RAM 223, and executes application programs copied in the RAM 223, to perform various operations. As such, the CPU 221 may perform various operations according to the execution of the application program stored in the storage unit 270.

As aforementioned, when a touch or any other user manipulation is sensed in the user terminal apparatus 200, the control unit 220 may determine whether or not the user manipulation is deliberate or not. When the user manipulation is determined as a deliberate user manipulation, the control unit 220 may read the information on the operations corresponding to that user manipulation from the storage unit 270, and perform operations corresponding to that information. The aforementioned operations of the control unit 220 may be embodied by execution of various programs stored in the storage unit 270.

The aforementioned CPU may be embodied as at least one of a single core processor, multi core processor, triple core processor and quad core processor. In the case of a multi core processor, each processor configuring the multi core processor performs various processes independently.

The software layer structure configuring the control unit 220 is explained in detail hereinbelow.

Figure 12:
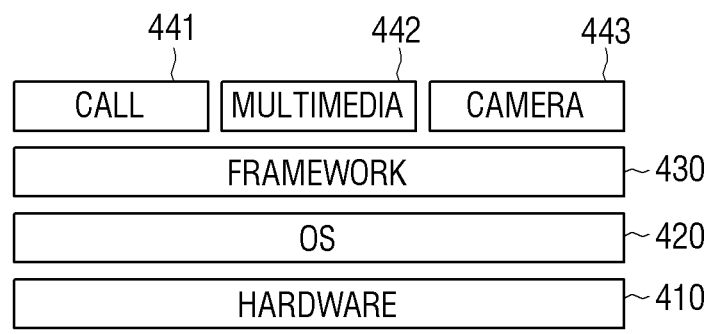
FIG. 12 is a view for explaining a system layered structure of a user terminal apparatus according to the aforementioned exemplary embodiment of the present disclosure.

FIG. 12 is a view for explaining a system layered structure of the user terminal apparatus 200 according to the aforementioned exemplary embodiment of the present disclosure.

With reference to FIG. 12, the user terminal apparatus 200 includes a hardware 410, an operating system (OS) 420 which drives the hardware 410, application layers 441~443 which is managed in a process by the operating system and uses resources to provide user services, and a framework layer 430 which relays the operating system and application.

The operating system (OS) 420 performs the function of controlling the overall operations of the hardware 410 and managing the process corresponding to each application. That is, OS 420 is a layer in charge of basic functions such as hardware management, memory, and security etc. The OS 420 includes modules such as a display driver for driving the display unit 290, a communication driver for data transceiving, camera driver for driving a camera, audio driver for driving an audio unit, and a power manager etc. In addition, an API library where a developer may approach and a runtime may be included. The OS 420 processes calling of applications, and operates the hardware according to the processed results.

As a layer superior than OS 420, there exists a framework layer 430. The framework 430 performs a role of connecting the application layer and the OS layer 420. That is, the framework layer 430 includes a location manager, notification manager and frame butter for displaying images on the touch screen unit.

Above the framework layer 430, there are application layers 441, 442, 443 which embody various functions. For example, various application programs such as telephone applications 441, multimedia applications 443, and camera applications 443 etc. may be included.

The applications 441~443 provide the user interface, receives commands from users and transmit the commands to the OS 420 through the framework, or requests support from the OS 420. The OS 420 processes system call, and manages operations of various applications. In addition, the OS 420 operates various hardware configurations which include the display unit 290 according the system call processing results.

The display method, data receiving method, and data transmitting method to be explained hereinbelow may be embodied as a program which includes executable algorithms which can be executed in a computer, and the program may be stored in the storage unit 270 of the user terminal apparatus 200 in an application format. In this case, the operating system executes the data transceiving method to be explained hereinbelow by the application operations according to the use commands, and accordingly, the operating system operates various hardware and transceives data. The display method, data receiving method, and data transmitting method according to the present disclosure will be explained hereinbelow.

Configurations and Operations of the External Apparatus

The configurations and operations of the external apparatus 300 according to various exemplary embodiments of the present disclosure will be explained hereinbelow.

Figure 13:
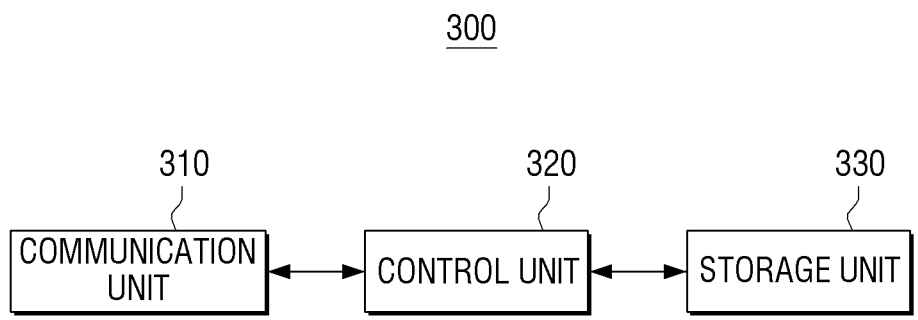
FIG. 13 is a block diagram illustrating a configuration of an external apparatus according to various exemplary embodiments of the present disclosure.

FIG. 13 is a block diagram illustrating a configuration of the external apparatus 300 according to various exemplary embodiments of the present disclosure.

Herein, the external apparatus 300 includes all types of computing systems that may process data in a broad perspective. Therefore, the external apparatus 300 includes similar configurations of a general computing system just like the aforementioned user terminal apparatus 200. For example, the external apparatus 300 may include an input/output means, processor for control/calculation, storage unit 330, and communication means. However, the configurations of the user terminal apparatus 200 and display apparatus 100 which are similar to the aforementioned configurations were already explained, and thus only the configurations necessary for explaining the present disclosure will be explained hereinbelow.

The external apparatus 300 according to various exemplary embodiments of the present disclosure includes a storage unit 330, communication unit 310, and control unit 320.

The storage unit 330 is a configuration of storing various types of data, which stores equipment identification information corresponding to the plurality of display apparatus 100. Just as the storage unit 270 of the user terminal apparatus 200, the storage unit 330 may be embodied as at least one of a memory card (for example, SD Card, memory stick), non-volatile memory, volatile memory, hard disk drive (HDD) or solid state drive (SSD) etc. attachable/detachable to/from a ROM, RAM, or user terminal apparatus 200. The storage unit 330 may store massive data due to its characteristic as an external apparatus 300.

The communication unit 310 is a configuration of performing communication with the user terminal apparatus 200.

The communication unit 310 is a configuration which performs communication with the user terminal apparatus 200.

When pattern information is identified based on the placement situation of the pattern frame included in the photographed image, the communication unit 310 receives equipment identification information mapped to the identified pattern information from the user terminal apparatus 200. However, mapping between the equipment identification information and pattern information may be made in the external apparatus 300, and thus in another exemplary embodiment, the communication unit 310 may receive only the pattern information identified based on the placement situation of the pattern frame included in the image photographed from the user terminal apparatus 200. In this case, the control unit 320 of the external apparatus 300 determines the equipment identification information mapped with the pattern information.

In an exemplary embodiment which received equipment identification information, the communication unit 310 transmits the data related to the display apparatus 100 corresponding to the received equipment identification information to the user terminal apparatus 200. However, in an exemplary embodiment which receives only the pattern information, the communication unit 310 receives the equipment identification information and then transmits the data related to the display apparatus 100 corresponding to the equipment identification information to the user terminal apparatus 200.

The control unit 320 is a configuration which controls the overall operations of the external apparatus 300. Especially, in an exemplary embodiment which receives equipment identification information, when equipment identification information which is identical to the received equipment identification information exists, the control unit 320 controls the communication unit 310 to transmit the data related to the display apparatus 100 corresponding to the received equipment identification information to user terminal.

However, in an exemplary embodiment which receives only the pattern information, the control unit 320 reads the equipment identification information matching the received pattern information from the storage unit 330, and controls the communication unit 310 to transmit the data related to the display apparatus 100 corresponding to the read equipment identification information to the user terminal.

Display Method, Data Receiving Method, Data Transmitting Method

Display methods, data receiving methods, and data transmitting methods according to various exemplary embodiments of the present disclosure are explained hereinbelow. Besides new technological facts explained hereinbelow, each method and step explained hereinbelow are practically the same as the operations of the display apparatus user terminal and external apparatus aforementioned.

Figure 14:
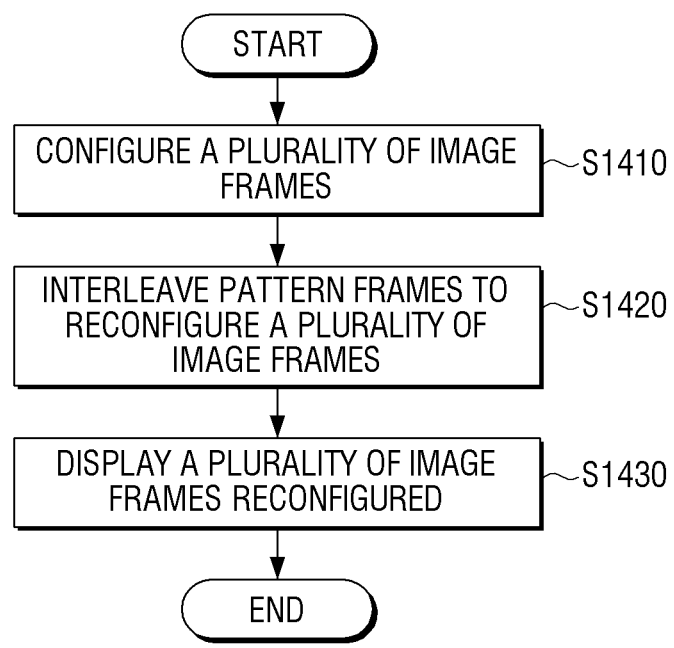
FIGS. 14 to 15 are flowcharts of a display method according to various exemplary embodiments of the present disclosure.
Figure 15:
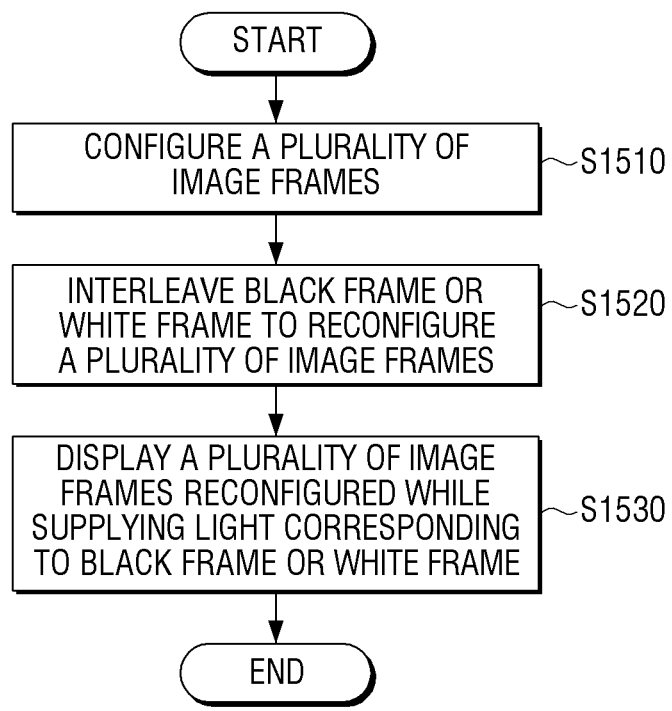

FIGS. 14 to 15 are flowcharts of a display method according to various exemplary embodiments of the present disclosure.

With reference to FIG. 14, the display method according to various exemplary embodiments includes interleaving pattern frames between the plurality of image frames and reconfiguring the plurality of image frames (S1410) and displaying the reconfigured plurality of image frames. Herein, the predetermined pattern information may be information where the external apparatus identifies the display apparatus.

In addition, with reference to FIG. 15, the display method according to various exemplary embodiments includes configuring a plurality of image frames (S1510), interleaving a black frame or white frame between the plurality of image frames according to the predetermined pattern information and reconfiguring the plurality of image frames (S1520), and controlling the backlight to supply light having a lowest brightness in a section where the black frame is interleaved and to supply light having a highest brightness in a section where the white frame is interleaved while displaying the reconfigured plurality of image frames (S1530). Herein, the predetermined pattern information may be information where the external apparatus identifies the display apparatus.

Figure 16:
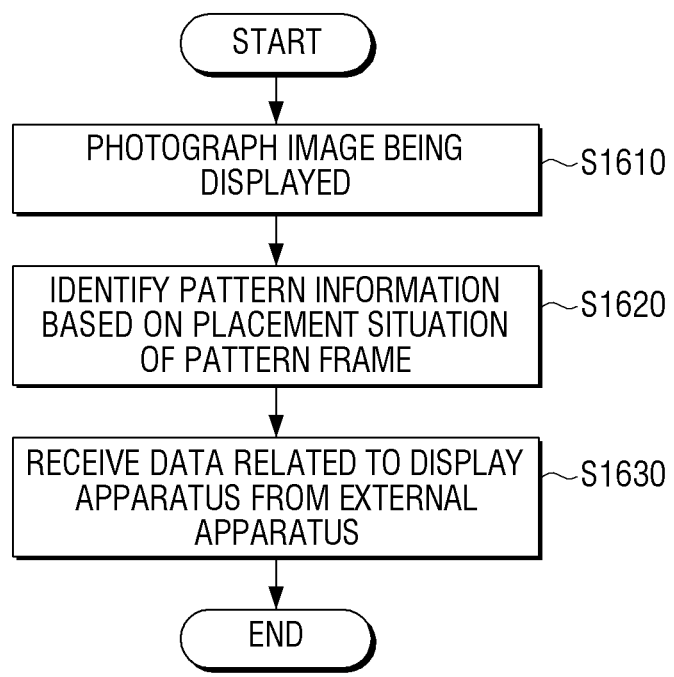
FIGS. 16 to 18 are flowcharts of a data receiving method according to various exemplary embodiments of the present disclosure.
Figure 17:
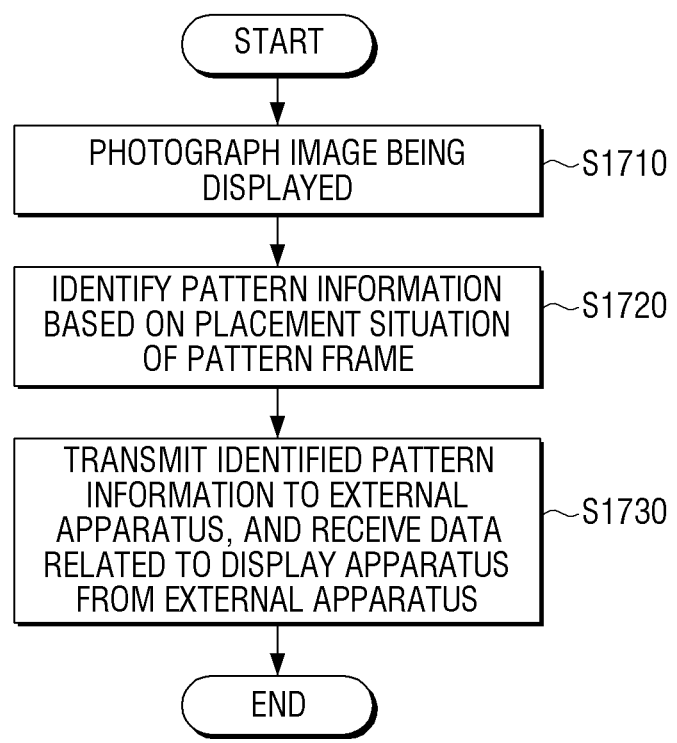
Figure 18:
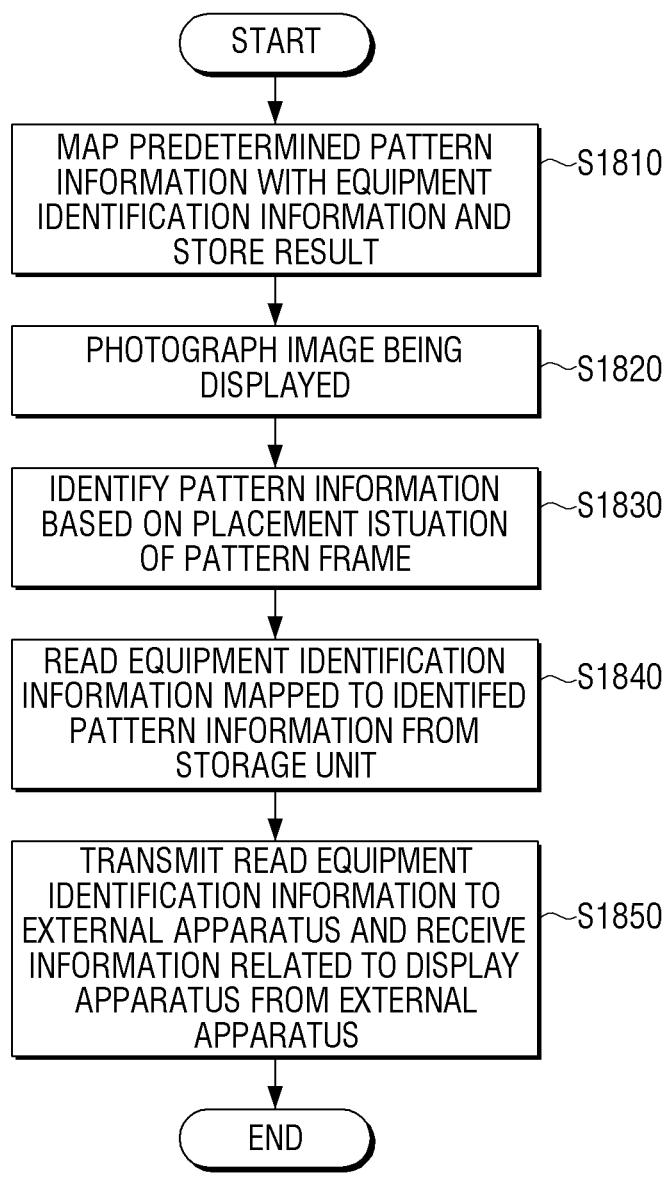

FIGS. 16 to 18 are flowcharts of a data receiving method according to various exemplary embodiments of the present disclosure.

With reference to FIG. 16, the data receiving method according to various exemplary embodiments includes photographing an image displayed on the display apparatus at a photographing speed above a frame rate of the display apparatus (S1610), identifying the pattern information based on the placement situation of the pattern frame included in the photographed image (S1620), and receiving the data related to the display apparatus from the external apparatus based on the identified pattern information (S1630).

In addition, with reference to FIG. 17, the data receiving method according to various exemplary embodiments of the present disclosure may include photographing images displayed on the display apparatus at a photographing speed above the frame rate of the display apparatus (S1710), identifying the pattern information based on the placement situation of the pattern frame included in the photographed image (S1720), and transmitting the identified pattern information to the external apparatus, and receiving the data related to the display apparatus from the external apparatus (S1730).

In addition, with reference to FIG. 18, the data receiving method according to various exemplary embodiments of the present disclosure may include mapping the predetermined pattern information to the equipment identification information and storing the mapped pattern information (S1810), photographing the image displayed on the display apparatus at a photographing speed above the frame rate of the display apparatus (S1820), identifying the pattern information based on the placement situation of the pattern frame included in the photographed image (S1830), reading the equipment identification information mapped to the identified pattern information from the storage unit (S1840), and transmitting the read equipment identification information to the external apparatus, and receiving the information related to the display apparatus from the external apparatus (S1850).

In the aforementioned exemplary embodiments, the data related to the display apparatus may be at least one of the audio data and second contents corresponding to the image output by the display apparatus.

In addition, in the aforementioned exemplary embodiments, the data related to the display apparatus may be information for obtaining a control authority regarding the display apparatus.

Figure 19:
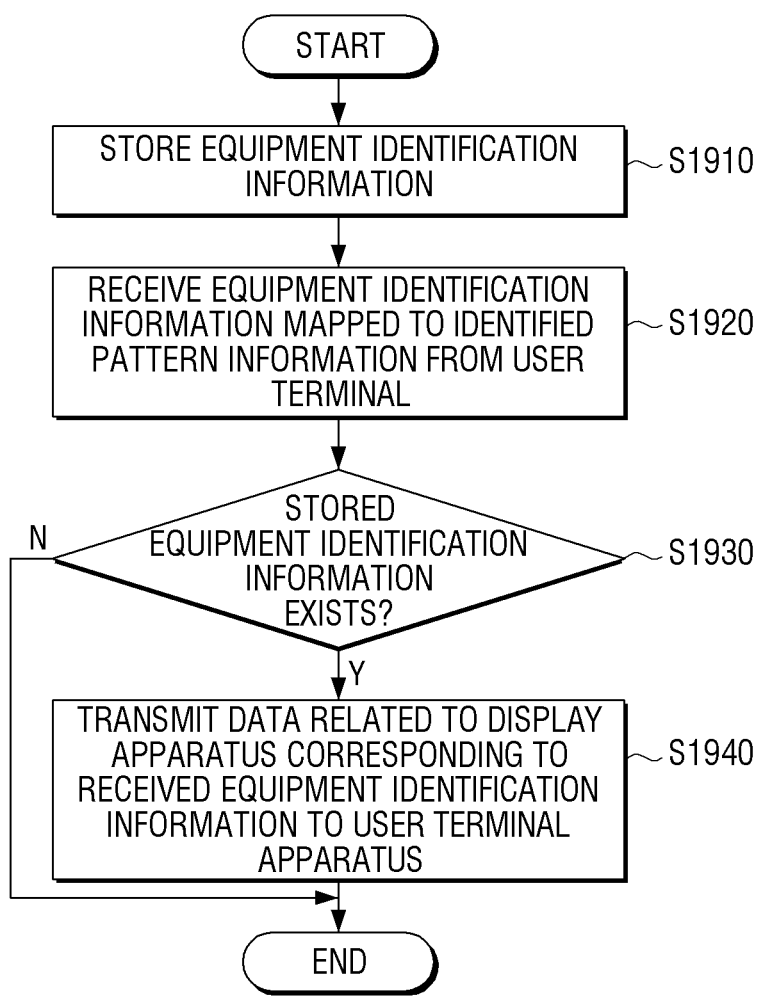
FIG. 19 is a flowchart of a data transmitting method according to various exemplary embodiments of the present disclosure.

FIG. 19 is a flowchart of the data transmitting method according to various exemplary embodiments of the present disclosure.

With reference to FIG. 19, the data transmitting method according to various exemplary embodiments of the present disclosure includes storing the equipment identification information corresponding to the plurality of display apparatuses (S1910), receiving equipment identification information which is mapped to the identified pattern information when the pattern information is identified based on the placement situation of the pattern frame included in the photographed image from the user terminal (S1920), and when there is equipment identification information stored corresponding to the received equipment identification information (S1930-Y), transmitting the data related to the display apparatus corresponding to the received equipment identification information to the user terminal apparatus (S1940).

Recording Medium

The aforementioned display method, data receiving method, and data transmitting method may be embodied as a program which includes executable algorithms which can be executed in a computer, and the program may be stored in a non-transitory computer readable medium and be provided.

A non-transitory readable medium refers to a medium where it is possible to store data semi-permanently and not temporarily and read the stored data by a device, such as a resistor, cache, and memory etc. More specifically, the aforementioned various applications or programs may be stored and provided in non-transitory readable medium such as a CD, DVD, hard disk, blueray disk, USB, memory card, and ROM etc.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A display apparatus comprising:
    a signal processor which processes a plurality of image frames;
    a display unit which displays the plurality of image frames processed by the signal processor; and
    a controller configured to control the signal processor to interleave a plurality of pattern frames between the plurality of image frames and to display the plurality of images frames which are interleaved with the plurality of pattern frames,
    wherein the plurality of pattern frames are pieces of pattern information, and
    wherein the pattern information is used by an external apparatus to identify the display apparatus.

2. The display apparatus according to claim 1, further comprising a backlight unit which provides light to the display unit,
    wherein the pattern frame is one from among a black frame and a white frame, and
    the controller controls the backlight unit to supply light having a lowest brightness in a section where the black frame is interleaved, and to supply light having a highest brightness in a section where the white frame is interleaved.

3. The display apparatus according to claim 1, wherein the pattern frame is a frame which represents a pattern through placement of one or more frames.

4. The display apparatus according to claim 1, wherein the pattern information is predetermined.

5. A terminal apparatus, comprising:
    a communicator configured to communicate with an external apparatus;
    an image sensor which photographs images on a display apparatus at a pre-determined photographing speed; and
    a controller configured to control to extract a plurality of pattern frames interleaved with image frames from the images photographed by the image sensor, and to obtain pattern information based on an arrangement order of the extracted plurality of pattern frame,
    wherein the pattern information is used by the external apparatus to identify the display apparatus.

6. The terminal apparatus according to claim 5, wherein the obtained pattern information is transmitted to the external apparatus, and data related to the display apparatus is received from the external apparatus.

7. The terminal apparatus according to claim 5, further comprising a storage which maps predetermined pattern information with equipment identification information and stores a result of the mapping,
    wherein the controller controls to read the equipment identification information mapped to the obtained pattern information from the storage, to transmit the read equipment identification information to the external apparatus, and to receive data related to the display apparatus from the external apparatus.

8. The terminal apparatus according to claim 5, wherein the data related to the display apparatus is at least one from among audio data corresponding to the image that the display apparatus outputs and other contents corresponding to the image displayed by the display apparatus.

9. The terminal apparatus according to claim 5, wherein the data related to the display apparatus is information for obtaining a control authority relating to the display apparatus.

10. The terminal apparatus according to claim 5, wherein the pre-determined photographing speed is a speed which can recognize each of the plurality of pattern frames and the image frames.

11. A display method, comprising:
    processing a plurality of image frames;
    interleaving a plurality of pattern frames between a plurality of image frames; and
    displaying the plurality of image frames which are interleaved with the pattern frames,
    wherein the plurality of pattern frames are pieces of pattern information,
    wherein the pattern information is used by an external apparatus to identify a display apparatus.

12. The display method according to claim 11, wherein the pattern frame includes one from among a black frame and a white frame, and
    further comprising controlling the backlight unit to supply light having a lowest brightness in a section where the black frame is interleaved, and to supply light having a highest brightness in a section where the white frame is interleaved.

13. A non-transitory recording medium where a program for performing a display method according to claim 11 is recorded.

14. A data receiving method comprising:
    photographing images on a display apparatus at a pre-determined photographing speed;
    extracting a plurality of pattern frames interleaved with image frames from the photographed images; and
    obtaining pattern information based on an arrangement order of the extracted plurality of pattern frames,
    wherein the pattern information is used by an external apparatus to identify the display apparatus.

15. The data receiving method according to claim 14, further comprising transmitting the obtained pattern information to the external apparatus, and receiving the data related to the display apparatus from the external apparatus.

16. The data receiving method according to claim 14, further comprising mapping predetermined pattern information with equipment identification information and storing a result of the mapping, and
    reading the equipment identification information mapped to the obtained pattern information from the storage, transmitting the read equipment identification information to the external apparatus, and receiving the information related to the display apparatus from the external apparatus.

17. The data receiving method according to claim 14, wherein the data related to the display apparatus is at least one from among audio data corresponding to the image that the display apparatus outputs and other contents corresponding to the image displayed on the display apparatus.

18. The data receiving method according to claim 14, wherein the data related to the display apparatus is information for obtaining a control authority related to the display apparatus.

19. A non-transitory recording medium where a program for performing a data receiving method according to claim 14 is recorded.

20. The data receiving method according to claim 14, wherein pre-determined photographing speed is a speed which can recognize each of the plurality of pattern frames and the image frames.

* * * * *